US011200795B2

(12) United States Patent
Awai

(10) Patent No.: US 11,200,795 B2
(45) Date of Patent: Dec. 14, 2021

(54) INFORMATION PROCESSING APPARATUS, INFORMATION PROCESSING METHOD, MOVING OBJECT, AND VEHICLE

(71) Applicant: Sony Corporation, Tokyo (JP)

(72) Inventor: Shoichi Awai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/755,158

(22) PCT Filed: Oct. 4, 2018

(86) PCT No.: PCT/JP2018/037133
§ 371 (c)(1),
(2) Date: Apr. 10, 2020

(87) PCT Pub. No.: WO2019/078010
PCT Pub. Date: Apr. 25, 2019

(65) Prior Publication Data
US 2020/0302780 A1    Sep. 24, 2020

(30) Foreign Application Priority Data

Oct. 18, 2017 (JP) .............................. JP2017-201529

(51) Int. Cl.
*G08G 1/01* (2006.01)
*B60W 60/00* (2020.01)
*B60W 30/095* (2012.01)

(52) U.S. Cl.
CPC ............ *G08G 1/01* (2013.01); *B60W 30/0956* (2013.01); *B60W 60/0016* (2020.02); *B60W 60/0027* (2020.02)

(58) Field of Classification Search
CPC ............... G08G 1/01; B60W 60/0016; B60W 60/0027; B60W 30/0956
See application file for complete search history.

(56) References Cited

U.S. PATENT DOCUMENTS 8,352,111 B2 * 1/2013 Mudalige ............... G08G 1/163
701/24
8,571,786 B2 * 10/2013 Iwasaki ................. B60W 10/06
701/300

(Continued)

FOREIGN PATENT DOCUMENTS

DE  102015201555 A1   8/2016
JP  2006-313519 A    11/2006

(Continued)

OTHER PUBLICATIONS

International Search Report and Written Opinion dated Jan. 8, 2019 for PCT/JP2018/037133 filed on Oct. 4, 2018, 9 pages including English Translation of the International Search Report.

*Primary Examiner* — Emily C Terrell
*Assistant Examiner* — Rufus C Point
(74) *Attorney, Agent, or Firm* — Xsensus LLP

(57) ABSTRACT

The present technology relates to an information processing apparatus, an information processing method, a moving object, and a vehicle that enable the situation of another moving object around a moving object to be accurately grasped.

An information processing apparatus includes: a moving object detection unit that detects another moving object around a moving object; and a moving object group detection unit that detects a moving object group including two or more of the other moving objects on the basis of one or more of a position, speed, and movement direction of the other moving object. The present technology can be applied to, for example, a system that controls automatic driving of a vehicle.

14 Claims, 15 Drawing Sheets

(56) References Cited

U.S. PATENT DOCUMENTS

| | | | | |
|---|---|---|---|---|
| 2002/0059017 | A1* | 5/2002 | Yamane | G08G 1/08 |
| | | | | 701/1 |
| 2011/0068949 | A1* | 3/2011 | Ieda | H01Q 1/3208 |
| | | | | 340/902 |
| 2011/0118965 | A1* | 5/2011 | Aben | G08G 1/096716 |
| | | | | 701/117 |
| 2012/0078498 | A1* | 3/2012 | Iwasaki | B60W 10/06 |
| | | | | 701/300 |
| 2014/0107867 | A1* | 4/2014 | Yamashiro | G05D 1/0293 |
| | | | | 701/2 |
| 2014/0316671 | A1* | 10/2014 | Okamoto | G08G 1/22 |
| | | | | 701/96 |
| 2016/0146619 | A1* | 5/2016 | Song | H04W 4/046 |
| | | | | 701/537 |
| 2016/0174459 | A1* | 6/2016 | Balutis | G05D 1/0234 |
| | | | | 701/25 |
| 2017/0249839 | A1* | 8/2017 | Becker | H04W 4/90 |
| 2018/0151077 | A1* | 5/2018 | Lee | B60Q 9/008 |
| 2018/0225975 | A1* | 8/2018 | Park | G08G 1/052 |
| 2018/0237012 | A1* | 8/2018 | Jammoussi | G05D 1/0088 |
| 2019/0265065 | A1* | 8/2019 | Yamada | G08G 1/012 |
| 2020/0184827 | A1* | 6/2020 | Park | H04L 67/125 |

FOREIGN PATENT DOCUMENTS

| | | |
|---|---|---|
| JP | 2009-75856 A | 4/2009 |
| JP | 2010-182207 A | 8/2010 |
| JP | 2017-182586 A | 10/2017 |

* cited by examiner

INFORMATION PROCESSING APPARATUS, INFORMATION PROCESSING METHOD, MOVING OBJECT, AND VEHICLE

CROSS-REFERENCE TO RELATED APPLICATIONS

The present application is based on PCT filing PCT/JP2018/037133, filed Oct. 4, 2018, which claims priority to JP 2017-201529, filed Oct. 18, 2017, the entire contents of each are incorporated herein by reference.

TECHNICAL FIELD

The present technology relates to an information processing apparatus, an information processing method, a moving object, and a vehicle, particularly to an information processing apparatus, an information processing method, a moving object, and a vehicle preferably used in a case of detecting the situation of another moving object around a moving object such as a vehicle.

BACKGROUND ART

Traditionally, driving support control over a vehicle to be supported is proposed. In the control, in a case where a vehicle in front of the vehicle to be supported starts deceleration, deceleration action of a vehicle to be predicted is predicted on the basis of past deceleration operation of a driver in the vehicle to be predicted. The vehicle to be predicted travels between the vehicle that has started deceleration and the vehicle to be supported. The driving support control over the vehicle to be supported is performed on the basis of the predicted deceleration action and the traffic situation of a road (e.g., see Patent Document 1).

CITATION LIST

Patent Document

Patent Document 1: Japanese Patent Application Laid-Open No. 2015-230511

SUMMARY OF THE INVENTION

Problems to be Solved by the Invention

In contrast, for safer automatic driving and driving support, the situation of a surrounding vehicle is desired to be accurately grasped by not only the method described in Patent Document 1 but various methods.

The present technology has been made in view of such a situation, and is intended to enable the situation of another moving object around a moving object such as a vehicle to be accurately grasped.

Solutions to Problems

An information processing apparatus according to a first aspect of the present technology includes: a moving object detection unit that detects another moving object around a moving object; and a moving object group detection unit that detects a moving object group including two or more of the other moving objects on the basis of one or more of a position, speed, and movement direction of the other moving object.

In an information processing method according to the first aspect of the present technology, an information processing layer apparatus detects another moving object around a moving object; and detects a moving object group including two or more of the other moving objects on the basis of one or more of a position, speed, and movement direction of the other moving object.

A moving object according to a second aspect of the present technology includes: a moving object detection unit that detects another surrounding moving object; and a moving object group detection unit that detects a moving object group including two or more of the other moving objects on the basis of one or more of a position, speed, and movement direction of the other moving object.

A vehicle according to a third aspect of the present technology includes: a vehicle detection unit that detects another surrounding vehicle; and a vehicle group detection unit that detects a vehicle group including two or more of the other vehicles on the basis of one or more of a position, speed, and movement direction of the other vehicle.

In the first aspect of the present technology, another moving object around a moving object is detected, and a moving object group including two or more of the other moving objects is detected on the basis of one or more of a position, speed, and movement direction of the other moving object.

In the second aspect of the present technology, another surrounding moving object is detected, and a moving object group including two or more of the other moving objects is detected on the basis of one or more of a position, speed, and movement direction of the other moving object.

In a third aspect of the present technology, another surrounding vehicle is detected, and a vehicle group including two or more of the other vehicles is detected on the basis of one or more of a position, speed, and movement direction of the other vehicle.

Effects of the Invention

According to the first to third aspects of the present technology, the situation of another moving object around a moving object such as a vehicle can be accurately grasped. As a result, the action of the moving object can be appropriately controlled.

Note that the effects described here are not necessarily limited, and any of the effects described in the present disclosure may be obtained.

MODE FOR CARRYING OUT THE INVENTION

An embodiment for carrying out the present technology will be described below. The description will be given in the following order.

1. Configuration Example of Vehicle Control System
2. Embodiment
3. Variations
4. Others

1. Configuration Example of Vehicle Control System

Figure 1:
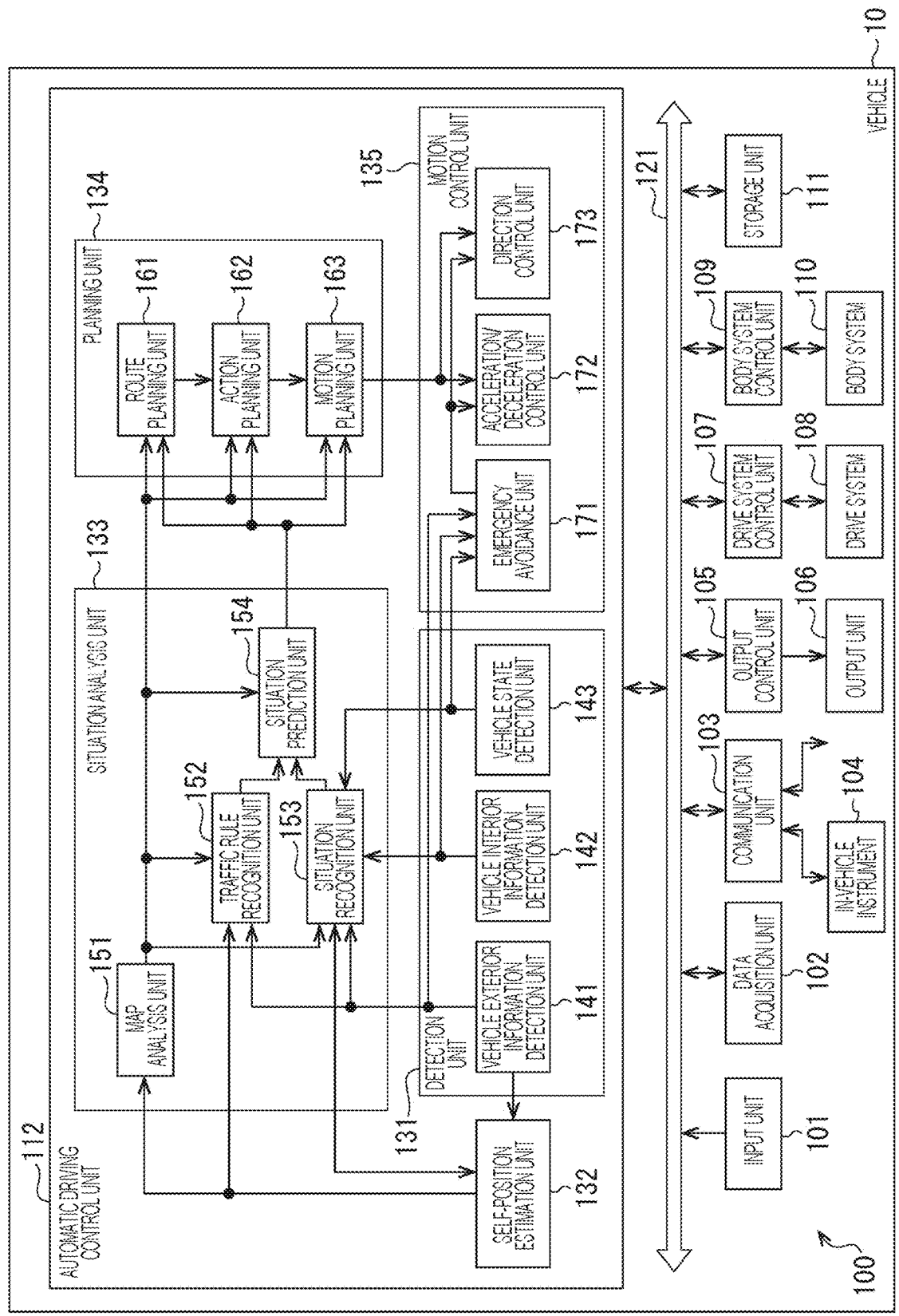
FIG. 1 is a block diagram illustrating a configuration example of the schematic function of a vehicle control system to which the present technology can be applied.

FIG. 1 is a block diagram illustrating a configuration example of the schematic function of a vehicle control system 100. The vehicle control system 100 is one example of a moving object control system to which the present technology can be applied.

The vehicle control system 100 is provided in a vehicle 10, and performs various controls for the vehicle 10. Note that, in a case where the vehicle 10 is distinguished from other vehicles, the vehicle 10 is hereinafter referred to as a host car or a host vehicle.

The vehicle control system 100 includes an input unit 101, a data acquisition unit 102, a communication unit 103, an in-vehicle instrument 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are mutually connected via a communication network 121. The communication network 121 includes, for example, an onboard communication network in conformity with any standard and a bus. The onboard communication network includes, for example, a controller area network (CAN), a local interconnect network (LIN), a local area network (LAN), FlexRay (registered trademark), and the like. Note that each part of the vehicle control system 100 may be directly connected without using the communication network 121.

Note that, in a case where each unit of the vehicle control system 100 communicates via the communication network 121, the description of the communication network 121 is omitted. For example, in a case where the input unit 101 and the automatic driving control unit 112 communicate via the communication network 121, it is simply described that the input unit 101 and the automatic driving control unit 112 communicate.

The input unit 101 includes an apparatus used by a passenger for inputting, for example, various pieces of data and instructions. For example, the input unit 101 includes an operation device such as a touch panel, a button, a microphone, a switch, and a lever, an operation device capable of receiving input by a method other than manual operation, such as voice and gesture, and the like. Furthermore, for example, the input unit 101 may be a remote control apparatus or an external connection instrument. The remote control apparatus uses infrared rays or other radio waves. The external connection instrument includes, for example, a mobile device and a wearable device in response to the operation of the vehicle control system 100. The input unit 101 generates an input signal on the basis of, for example, data or instructions input by a passenger, and supplies the input signal to each unit of the vehicle control system 100.

The data acquisition unit 102 includes, for example, various sensors that acquire data to be used for processing of the vehicle control system 100, and supplies the acquired data to each unit of the vehicle control system 100.

For example, the data acquisition unit 102 includes various sensors for detecting, for example, the state of the vehicle 10. Specifically, for example, the data acquisition unit 102 includes a gyro sensor, an acceleration sensor, an inertial measurement unit (IMU), and a sensor for detecting, for example, an accelerator pedal operation amount, a brake pedal operation amount, a steering angle of a steering wheel, an engine speed, a motor speed, a rotational speed of a wheel, and the like.

Furthermore, for example, the data acquisition unit 102 includes various sensors for detecting information regarding the outside of the vehicle 10. Specifically, for example, the data acquisition unit 102 includes an imaging apparatus such as a time of flight (ToF) camera, a stereo camera, a monocular camera, an infrared camera, and other cameras. Furthermore, for example, the data acquisition unit 102 includes an environment sensor and a surrounding information detection sensor. The environment sensor detects, for example, weather and a meteorological phenomenon. The surrounding information detection sensor detects an object around the vehicle 10. The environment sensor includes, for example, a raindrop sensor, a fog sensor, a sunshine sensor, a snow sensor, and the like. The surrounding information detection sensor includes, for example, an ultrasonic sensor, a radar, light detection and ranging or laser imaging detection and ranging (LiDAR), a sonar, and the like.

Moreover, for example, the data acquisition unit 102 includes various sensors for detecting the current position of the vehicle 10. Specifically, for example, the data acquisition unit 102 includes a global navigation satellite system (GNSS) receiver that receives a GNSS signal from a GNSS satellite, and the like.

Furthermore, for example, the data acquisition unit 102 includes various sensors for detecting information regarding the inside of the vehicle. Specifically, for example, the data acquisition unit 102 includes an imaging apparatus, a biosensor, a microphone, and the like. The imaging apparatus images a driver. The biosensor detects biological information of the driver. The microphone collects voice inside a vehicle. The biosensor is provided on, for example, a seat surface, a steering wheel, or the like, and detects biological information of a passenger sitting on a seat or a driver holding the steering wheel.

The communication unit 103 communicates with, for example, the in-vehicle instrument 104, various instruments, a server, and a base station outside the vehicle, transmits data supplied from each unit of the vehicle control system 100, and supplies received data to each unit of the vehicle control system 100. Note that a communication protocol supported by the communication unit 103 is not particularly limited, and the communication unit 103 can support a plurality of types of communication protocols.

For example, the communication unit 103 wirelessly communicates with the in-vehicle instrument 104 by, for example, a wireless LAN, Bluetooth (registered trademark), near field communication (NFC), or wireless USB (WUSB). Furthermore, for example, the communication unit 103 communicates by wire with the in-vehicle instrument 104 by using, for example, a universal serial bus (USB), a high-definition multimedia interface (HDMI) (registered trademark), or mobile high-definition link (MHL) via a connection terminal (and a cable if necessary) which is not illustrated.

Furthermore, for example, the communication unit 103 communicates with an instrument (e.g., application server or control server) existing on an external network (e.g., the Internet, cloud network, or business-operator-specific network) via a base station or an access point. Furthermore, for example, the communication unit 103 uses peer to peer (P2P) technology to communicate with a terminal (e.g., terminal of a pedestrian or a shop, or a machine type communication (MTC) terminal) in the vicinity of the vehicle 10. Moreover, for example, the communication unit 103 performs V2X communication such as vehicle to vehicle communication, vehicle to infrastructure communication, vehicle 10 to home communication, and vehicle to pedestrian communication. Furthermore, for example, the communication unit 103 includes a beacon receiving unit, receives radio waves or electromagnetic waves transmitted from, for example, a radio station installed on a road, and acquires information regarding, for example, the current position, a traffic jam, traffic regulation, or a required period of time.

The in-vehicle instrument 104 includes, for example, a mobile device or wearable device possessed by a passenger, an information instrument that is carried in or attached to the vehicle 10, a navigation apparatus that searches for a route to any destination, and the like.

The output control unit 105 controls the output of various pieces of information to the passenger of the vehicle 10 or the outside of the vehicle. For example, the output control unit 105 generates an output signal including at least one of visual information (e.g., image data) or auditory information (e.g., voice data), and supplies the output signal to the output unit 106 to control the output of the visual information and auditory information from the output unit 106. Specifically, for example, the output control unit 105 generates, for example, an overhead image or a panoramic image by combining pieces of image data captured by different imaging apparatuses of the data acquisition unit 102, and supplies an output signal including the generated image to the output unit 106. Furthermore, for example, the output control unit 105 generates voice data including, for example, a warning sound or a warning message against danger such as a collision, contact, and entry into a dangerous zone, and supplies an output signal including the generated voice data to the output unit 106.

The output unit 106 includes an apparatus capable of outputting visual information or auditory information to a passenger of the vehicle 10 or the outside of the vehicle. For example, the output unit 106 includes a display apparatus, an instrument panel, an audio speaker, a headphone, a wearable device such as a spectacle-type display worn by a passenger, a projector, a lamp, and the like. The display apparatus provided in the output unit 106 may be an apparatus for displaying visual information in the field of view of the driver, such as, for example, a head-up display, a transmissive display, and an apparatus having an augmented reality (AR) display function in addition to an apparatus having an ordinary display.

The drive system control unit 107 controls the drive system 108 by generating various control signals and supplying the control signals to the drive system 108. Furthermore, the drive system control unit 107 supplies a control signal to each unit other than the drive system 108, and gives, for example, a notification of the control state of the drive system 108 if necessary.

The drive system 108 includes various apparatuses related to a drive train of the vehicle 10. For example, the drive system 108 includes a driving force generation apparatus, a driving force transmission mechanism, a steering mechanism, a braking apparatus, an antilock brake system (ABS), an electronic stability control (ESC), an electric power steering apparatus, and the like. The driving force generation apparatus generates driving force for, for example, an internal combustion engine or a driving motor. The driving force transmission mechanism transmits the driving force to a wheel. The steering mechanism adjusts a rudder angle. The braking apparatus generates braking force.

The body system control unit 109 controls the body system 110 by generating various control signals and supplying the control signals to the body system 110. Furthermore, the body system control unit 109 supplies a control signal to each unit other than the body system 110, and gives, for example, a notification of the control state of the body system 110 if necessary.

The body system 110 includes various apparatuses of a body train equipped in a vehicle body. For example, the body system 110 includes a keyless entry system, a smart key system, a power window apparatus, a power seat, a steering wheel, an air conditioner, various lamps (e.g., headlamp, back lamp, brake lamp, blinker, fog lamp, and the like), and the like.

The storage unit 111 includes, for example, a magnetic storage device, such as a read only memory (ROM), a random access memory (RAM), and a hard disc drive (HDD), a semiconductor storage device, an optical storage device, a magneto-optical storage device, and the like. The storage unit 111 stores, for example, various programs and data used by each unit of the vehicle control system 100. For example, the storage unit 111 stores data regarding a map such as a three-dimensional high-precision map, a global map, and a local map. The high-precision map includes, for example, a dynamic map. The global map has a precision lower than that of the high-precision map, and covers a wide area. The local map contains information around the vehicle 10.

The automatic driving control unit 112 performs control related to automatic driving such as autonomous traveling or driving support. Specifically, for example, the automatic driving control unit 112 performs cooperative control for achieving a function of an advanced driver assistance system (ADAS) including, for example, avoidance of collision or shock mitigation of the vehicle 10, following traveling based on a distance between vehicles, vehicle speed maintenance traveling, warning against collision of the vehicle 10, or warning against lane departure of the vehicle 10. Furthermore, for example, the automatic driving control unit 112 performs cooperative control for, for example, automatic driving during which autonomous traveling is performed without depending on the operation of a driver. The automatic driving control unit 112 includes a detection unit 131, a self-position estimation unit 132, a situation analysis unit 133, a planning unit 134, and a motion control unit 135.

The detection unit 131 detects various pieces of information necessary for controlling automatic driving. The detection unit 131 includes a vehicle exterior information detection unit 141, a vehicle interior information detection unit 142, and a vehicle state detection unit 143.

The vehicle exterior information detection unit 141 performs processing of detecting information regarding the outside of the vehicle 10 on the basis of data or a signal from each unit of the vehicle control system 100. For example, the vehicle exterior information detection unit 141 performs processing of detecting, recognizing, and tracking an object around the vehicle 10, and processing of detecting a distance to the object. Examples of an object to be detected include a vehicle, a person, an obstacle, a structure, a road, a traffic light, a traffic sign, a road marking, and the like. Furthermore, for example, the vehicle exterior information detection unit 141 performs processing of detecting environments around the vehicle 10. The surrounding environment to be detected includes, for example, weather, temperature, humidity, brightness, the condition of a road surface, and the like. The vehicle exterior information detection unit 141 supplies data indicating the result of the detection processing to, for example, the self-position estimation unit 132, a map parsing unit 151, a traffic rule recognition unit 152, and a situation recognition unit 153 of the situation analysis unit 133, and an emergency avoidance unit 171 of the motion control unit 135.

The vehicle interior information detection unit 142 performs processing of detecting information regarding the inside of the vehicle on the basis of data or a signal from each unit of the vehicle control system 100. For example, the vehicle interior information detection unit 142 performs, for example, processing of authenticating and recognizing a driver, processing of detecting the state of the driver, processing of detecting a passenger, and processing of detecting environments inside the car. The state of a driver to be detected includes, for example, a physical condition, an arousal level, a concentration level, a fatigue level, line-of-sight direction, and the like. The environments inside a vehicle to be detected include, for example, temperature, humidity, brightness, smell, and the like. The vehicle interior information detection unit 142 supplies data indicating the result of the detection processing to, for example, the situation recognition unit 153 of the situation analysis unit 133 and the emergency avoidance unit 171 of the motion control unit 135.

The vehicle state detection unit 143 performs processing of detecting the state of the vehicle 10 on the basis of data or a signal from each unit of the vehicle control system 100. The state of the vehicle 10 to be detected includes, for example, speed, acceleration, a rudder angle, presence/absence and content of abnormality, a state of driving operation, a position and inclination of a power seat, the state of door lock, the states of other onboard instruments, and the like. The vehicle state detection unit 143 supplies data indicating the result of the detection processing to, for example, the situation recognition unit 153 of the situation analysis unit 133 and the emergency avoidance unit 171 of the motion control unit 135.

The self-position estimation unit 132 performs processing of estimating, for example, the position and posture of the vehicle 10 on the basis of data or a signal from each unit of the vehicle control system 100, such as the vehicle exterior information detection unit 141 and the situation recognition unit 153 of the situation analysis unit 133. Furthermore, the self-position estimation unit 132 generates a local map (hereinafter, referred to as a map for self-position estimation) used for self-position estimation if necessary. The map for self-position estimation is a high-precision map using a technique such as, for example, simultaneous localization and mapping (SLAM). The self-position estimation unit 132 supplies data indicating the result of the estimation processing to, for example, the map parsing unit 151 of the situation analysis unit 133, the traffic rule recognition unit 152, and the situation recognition unit 153. Furthermore, the self-position estimation unit 132 stores the map for self-position estimation in the storage unit 111.

The situation analysis unit 133 performs processing of analyzing the situation of the vehicle 10 and the surroundings. The situation analysis unit 133 includes the map parsing unit 151, the traffic rule recognition unit 152, the situation recognition unit 153, and a situation prediction unit 154.

The map parsing unit 151 performs processing of parsing various maps stored in the storage unit 111, and builds a map containing information necessary for processing of automatic driving while using data or a signal from each unit of the vehicle control system 100 such as the self-position estimation unit 132 and the vehicle exterior information detection unit 141 if necessary. The map parsing unit 151 supplies the built map to, for example, the traffic rule recognition unit 152, the situation recognition unit 153, the situation prediction unit 154, and a route planning unit 161, an action planning unit 162, and a motion planning unit 163 of the planning unit 134.

The traffic rule recognition unit 152 performs processing of recognizing a traffic rule around the vehicle 10 on the basis of data or a signal from each unit of the vehicle control system 100, such as the self-position estimation unit 132, the vehicle exterior information detection unit 141, and the map parsing unit 151. For example, the position and state of a signal around the vehicle 10, the content of traffic regulations around the vehicle 10, a travelable lane, and the like are recognized by the recognition processing. The traffic rule recognition unit 152 supplies data indicating the result of the recognition processing to, for example, the situation prediction unit 154.

The situation recognition unit 153 performs processing of recognizing the situation of the vehicle 10 on the basis of data or a signal from each unit of the vehicle control system 100, such as the self-position estimation unit 132, the vehicle exterior information detection unit 141, the vehicle interior information detection unit 142, the vehicle state detection unit 143, and the map parsing unit 151. For example, the situation recognition unit 153 performs processing of recognizing, for example, the situation of the vehicle 10, the situation around the vehicle 10, and the situation of a driver of the vehicle 10. Furthermore, the situation recognition unit 153 generates a local map (hereinafter, referred to as a map for situation recognition) used for recognizing the situation around the vehicle 10 if necessary. The map for situation recognition includes, for example, an occupancy grid map.

The situation of the vehicle 10 to be recognized includes, for example, the position, posture, and movement (e.g., speed, acceleration, movement direction, and the like) of the vehicle 10, presence/absence and content of abnormality, and the like. The situation around the vehicle 10 to be recognized includes, for example, the type and position of a surrounding still object, the type, position, and movement (e.g., speed, acceleration, movement direction, and the like) of a surrounding movable object, the configuration of a surrounding road, the state of the road surface, surrounding weather, temperature, humidity, brightness, and the like. The state of a driver to be recognized includes, for example, a physical condition, an arousal level, a concentration level, a fatigue level, movement of a line of sight, driving operation, and the like.

The situation recognition unit 153 supplies data (including a map for situation recognition if necessary) indicating the result of the recognition processing to, for example, the self-position estimation unit 132 and the situation prediction unit 154. Furthermore, the situation recognition unit 153 stores the map for situation recognition in the storage unit 111.

The situation prediction unit 154 performs processing of predicting the situation of the vehicle 10 on the basis of data or a signal from each unit of the vehicle control system 100, such as the map parsing unit 151, the traffic rule recognition unit 152, and the situation recognition unit 153. For example, the situation prediction unit 154 performs processing of predicting, for example, the situation of the vehicle 10, the situation around the vehicle 10, and the situation of a driver.

The situation of the vehicle 10 to be predicted includes, for example, the behavior of the vehicle 10, the occurrence of abnormality, a travelable distance, and the like. The situation around the vehicle 10 to be predicted includes, for example, the behavior of a movable object around the vehicle 10, change in the state of a signal, change in an environment such as weather, and the like. The situation of a driver to be predicted includes, for example, the behavior, physical condition, and the like of the driver.

The situation prediction unit 154 supplies data indicating the result of the prediction processing to, for example, the route planning unit 161, the action planning unit 162, and the motion planning unit 163 of the planning unit 134 together with data from the traffic rule recognition unit 152 and the situation recognition unit 153.

The route planning unit 161 plans a route to a destination on the basis of data or a signal from each unit of the vehicle control system 100, such as the map parsing unit 151 and the situation prediction unit 154. For example, the route planning unit 161 sets a route from the current position to the specified destination on the basis of a global map. Furthermore, for example, the route planning unit 161 appropriately changes the route on the basis of the situation of, for example, a traffic jam, an accident, a traffic regulation, and construction, the physical condition of a driver, and the like. The route planning unit 161 supplies data indicating the planned route to, for example, the action planning unit 162.

The action planning unit 162 plans the action of the vehicle 10 for safely traveling on the route planned by the route planning unit 161 within a planned period of time on the basis of data or a signal from each unit of the vehicle control system 100, such as the map parsing unit 151 and the situation prediction unit 154. For example, the action planning unit 162 makes a plan regarding, for example, start, stop, advancing direction (e.g., forward movement, backward movement, left turn, right turn, change in direction, and the like), traveling lane, traveling speed, and overtaking.

The action planning unit 162 supplies data indicating the planned action of the vehicle 10 to, for example, the motion planning unit 163.

The motion planning unit 163 plans the motion of the vehicle 10 for achieving action planned by the action planning unit 162 on the basis of data or a signal from each unit of the vehicle control system 100, such as the map parsing unit 151 and the situation prediction unit 154. For example, the motion planning unit 163 makes a plan regarding, for example, acceleration, deceleration, and traveling tracks. The motion planning unit 163 supplies data indicating the planned motion of the vehicle 10 to, for example, an acceleration/deceleration control unit 172 and a direction control unit 173 of the motion control unit 135.

The motion control unit 135 controls the motion of the vehicle 10. The motion control unit 135 includes the emergency avoidance unit 171, the acceleration/deceleration control unit 172, and the direction control unit 173.

The emergency avoidance unit 171 performs processing of detecting an emergency such as a collision, contact, entry into a dangerous zone, abnormality of a driver, and abnormality of the vehicle 10 on the basis of the detection results of the vehicle exterior information detection unit 141, the vehicle interior information detection unit 142, and the vehicle state detection unit 143. In a case of detecting the occurrence of an emergency, the emergency avoidance unit 171 plans motion of the vehicle 10 for avoiding an emergency such as sudden stop and sudden turn. The emergency avoidance unit 171 supplies data indicating the planned motion of the vehicle 10 to, for example, the acceleration/deceleration control unit 172 and the direction control unit 173.

The acceleration/deceleration control unit 172 performs acceleration/deceleration control for achieving the motion of the vehicle 10 planned by the motion planning unit 163 or the emergency avoidance unit 171. For example, the acceleration/deceleration control unit 172 calculates a control target value of a driving force generation apparatus or a braking apparatus for achieving planned acceleration, deceleration, or sudden stop, and supplies a control command indicating the calculated control target value to the drive system control unit 107.

The direction control unit 173 performs direction control for achieving the motion of the vehicle 10 planned by the motion planning unit 163 or the emergency avoidance unit 171. For example, the direction control unit 173 calculates a control target value of a steering mechanism for achieving a traveling track or sudden turn planned by the motion planning unit 163 or the emergency avoidance unit 171, and supplies a control command indicating the calculated control target value to the drive system control unit 107.

2. Embodiment

An embodiment of the present technology will now be described with reference to FIGS. 2 to 21.

Note that the embodiment is mainly related to processing of the data acquisition unit 102, the situation recognition unit 153, the situation prediction unit 154, and the action planning unit 162 of the vehicle control system 100 in FIG. 1.

<Configuration Example of Action Planning System>

Figure 2:
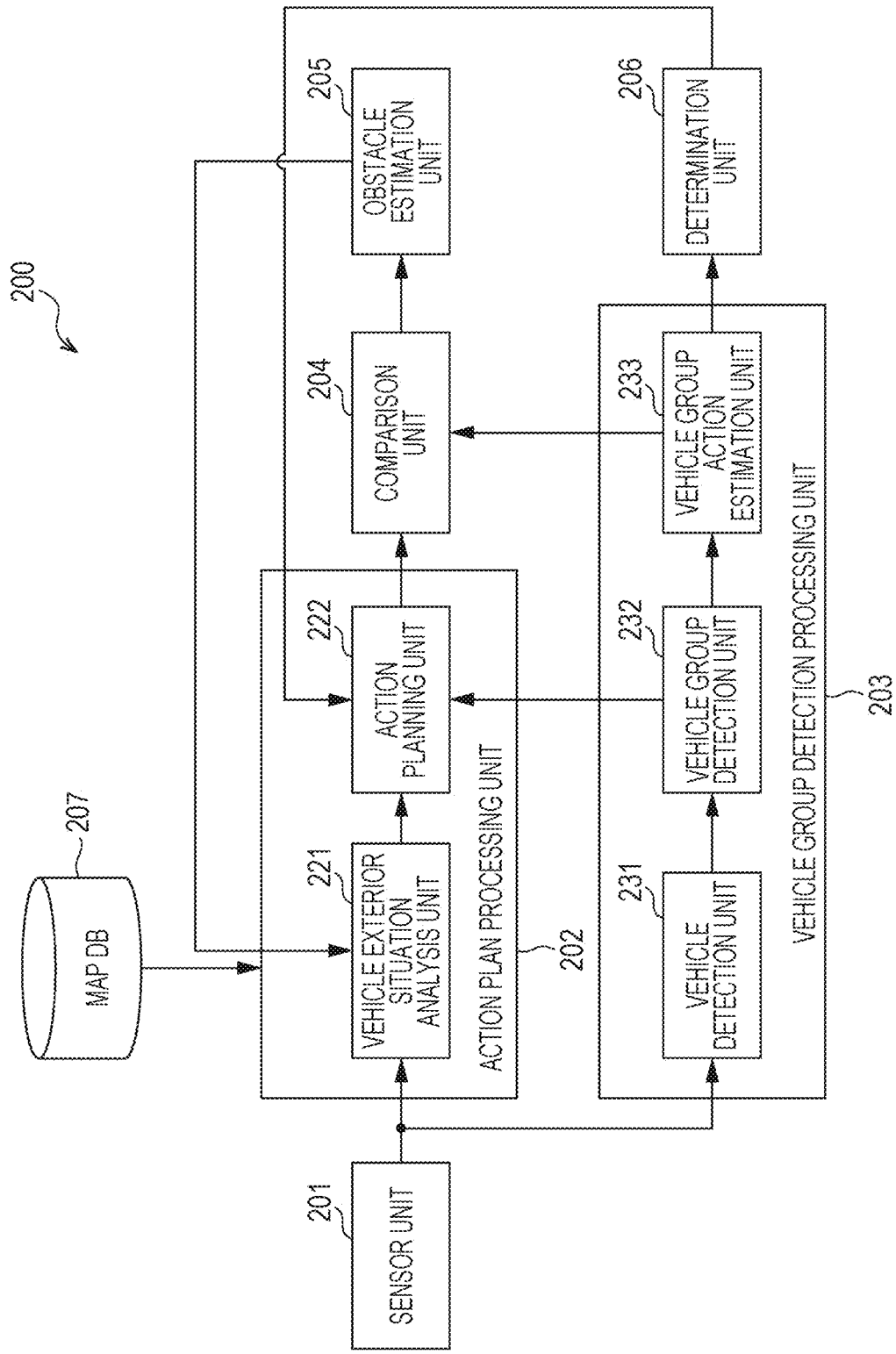
FIG. 2 is a block diagram illustrating one embodiment of an action planning system to which the present technology is applied.

FIG. 2 is a block diagram illustrating a configuration example of an action planning system 200. The action planning system 200 is one embodiment of an action planning system to which the present technology is applied.

The action planning system 200 detects the situation around the vehicle 10 provided with the action planning system 200, and plans an action of the vehicle 10 on the basis of a detection result regarding the situation around the vehicle 10. The action planning system 200 includes an observation data acquisition unit 201, an action plan processing unit 202, a vehicle group detection processing unit 203, a comparison unit 204, an obstacle estimation unit 205, a determination unit 206, and a map database (DB) 207.

The observation data acquisition unit 201 includes, for example, an imaging apparatus, the above-described surrounding information detection sensor, and a GNSS receiver, and acquires observation data indicating, for example, the situation around the vehicle 10. The observation data acquisition unit 201 supplies the acquired observation data to a vehicle exterior situation analysis unit 221 of the action plan processing unit 202 and a vehicle detection unit 231 of the vehicle group detection processing unit 203.

The action plan processing unit 202 performs processing of planning the action of the vehicle 10. The action plan processing unit 202 includes the vehicle exterior situation analysis unit 221 and an action planning unit 222.

The vehicle exterior situation analysis unit 221 performs processing of analyzing the situation around the vehicle 10 on the basis of observation data, map data stored in the map DB 207, and the estimation result regarding an obstacle from the obstacle estimation unit 205. The vehicle exterior situation analysis unit 221 supplies data indicating the analysis result regarding the situation around the vehicle 10 to the action planning unit 222.

The action planning unit 222 plans the action of the vehicle 10 on the basis of the analysis result regarding the situation around the vehicle 10, the detection result regarding a vehicle group from a vehicle group detection unit 232, and map data stored in the map DB 207. The action planning unit 222 supplies data indicating the planned action of the vehicle 10 to, for example, the comparison unit 204 and the motion planning unit 163 in FIG. 1.

The vehicle group detection processing unit 203 performs processing of detecting a vehicle group in front of the vehicle 10. The vehicle group detection processing unit 203 includes the vehicle detection unit 231, the vehicle group detection unit 232, and a vehicle group action estimation unit 233.

The vehicle detection unit 231 performs processing of detecting another vehicle in front of the vehicle 10 on the basis of the observation data. The vehicle detection unit 231 supplies data indicating the detection result regarding the other vehicle to the vehicle group detection unit 232.

The vehicle group detection unit 232 performs processing of detecting a vehicle group in front of the vehicle 10 on the basis of the detection result regarding the other vehicle. The vehicle group detection unit 232 supplies data indicating the detection result regarding the vehicle group to the action planning unit 222 and the vehicle group action estimation unit 233.

The vehicle group action estimation unit 233 performs processing of estimating an action plan of each vehicle group. The vehicle group action estimation unit 233 supplies the detection result regarding each vehicle group and data indicating the estimation result regarding the action plan of each vehicle group to, for example, the comparison unit 204, the determination unit 206, and the output control unit 105 in FIG. 1.

The comparison unit 204 compares a route (hereinafter referred to as a scheduled route) of the vehicle 10 planned by the action planning unit 222 with a route (hereinafter referred to as an estimated route) of each vehicle group estimated by the vehicle group action estimation unit 233.

The comparison unit 204 supplies data indicating the result of comparing the scheduled route of the vehicle 10 and the estimated route of each vehicle group to the obstacle estimation unit 205.

The obstacle estimation unit 205 estimates the position of an obstacle on the basis of the scheduled route of the vehicle 10 and the estimated route of each vehicle group. The obstacle estimation unit 205 supplies data indicating the estimation result regarding the obstacle to the vehicle exterior situation analysis unit 221.

The determination unit 206 determines the detection precision of a vehicle group and the estimation precision of an action plan of the vehicle group. The determination unit 206 supplies data indicating the determination result to the action planning unit 222.

The map DB 207 includes information around the vehicle 10, and stores map data used for planning the action of the vehicle 10.

<Action Planning Processing>

Figure 3:
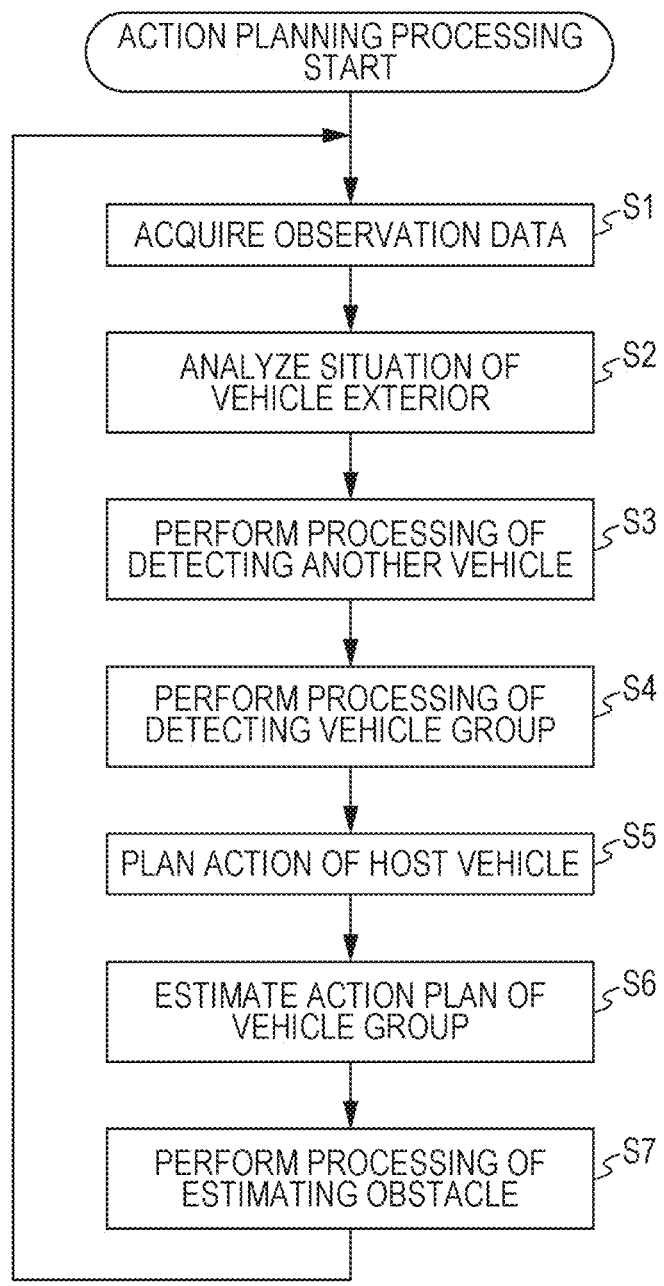
FIG. 3 is a flowchart for illustrating action planning processing performed by the action planning system.

Action planning processing executed by the action planning system 200 will now be described with reference to the flowchart of FIG. 3. Note that the processing is started, for example, at the time when an operation for running the vehicle 10 and starting driving is performed, for example, at the time when an ignition switch, a power switch, a start switch, or the like of the vehicle 10 is turned on. Furthermore, the processing is ended, for example, at the time when an operation for ending the driving is performed, for example, at the time when the ignition switch, the power switch, the start switch, or the like of the vehicle 10 is turned off.

In Step S1, the observation data acquisition unit 201 acquires observation data. For example, the observation data acquisition unit 201 captures an image of the front of the vehicle 10 with an imaging apparatus. Furthermore, for example, the observation data acquisition unit 201 detects an object around the vehicle 10 with the surrounding information detection sensor. Moreover, for example, the observation data acquisition unit 201 receives a GNSS signal from a GNSS satellite with a GNSS receiver. Then, the observation data acquisition unit 201 supplies an image of the front of the vehicle 10, sensor data indicating the detection result regarding an object, and observation data containing a GNSS signal to the vehicle exterior situation analysis unit 221 and the vehicle detection unit 231.

In Step S2, the vehicle exterior situation analysis unit 221 analyzes the situation of the outside of a vehicle. For example, the vehicle exterior situation analysis unit 221 detects an object such as another vehicle, a person, an obstacle, a structure, a road, a traffic light, a traffic sign, a road marking, and a road surface around the vehicle 10, the position thereof, and the like on the basis of the observation data. Furthermore, the vehicle exterior situation analysis unit 221 detects the current position of the vehicle 10 on the basis of a GNSS signal.

Then, the vehicle exterior situation analysis unit 221 performs processing of analyzing the situation around the vehicle 10 on the basis of the detection result regarding an object around the vehicle 10, the current position of the vehicle 10, map data stored in the map DB 207, and the estimation result regarding an obstacle from the later-described obstacle estimation unit 205. For example, the vehicle exterior situation analysis unit 221 analyzes the type, position, and movement (e.g., speed, acceleration, movement direction, and the like) of the object around the vehicle 10, the configuration of a surrounding road, the state of the road surface, and the like. The vehicle exterior situation analysis unit 221 supplies data indicating the analysis result regarding the situation around the vehicle 10 to the action planning unit 222.

In Step S3, the vehicle detection unit 231 performs processing of detecting another vehicle. Specifically, the vehicle detection unit 231 detects the position and speed vector (i.e., speed and movement direction) of another vehicle traveling in front of the vehicle 10 on the basis of observation data. The vehicle detection unit 231 supplies data indicating the detection result regarding the position and speed vector of the other vehicle to the vehicle group detection unit 232.

Note that any approach can be used for detecting the position and speed vector of the other vehicle. For example, a millimeter-wave radar can be provided in the observation data acquisition unit 201. The position and speed vector of the other vehicle can be detected in real time on the basis of data detected by the millimeter-wave radar. Furthermore, for example, a stereo camera can be provided in the observation data acquisition unit 201. The position and speed vector of the other vehicle can be detected in real time on the basis of an image captured by the stereo camera.

In Step S4, the vehicle group detection unit 232 performs processing of detecting a vehicle group. For example, the vehicle group detection unit 232 clusters the detected other vehicles into one or more clusters on the basis of the position and speed vector of each of the other vehicles, and recognizes each cluster as a vehicle group.

Each vehicle group includes, for example, two or more other vehicles that perform a similar action. For example, each vehicle group includes two or more other vehicles that move substantially in line in the advancing direction (front) of the vehicle 10.

FIGS. 4 to 8 illustrate examples of the vehicle group.

Figure 4:
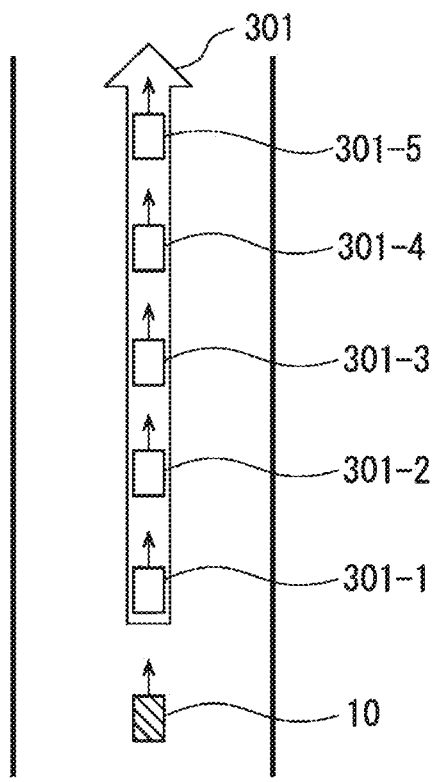
FIG. 4 illustrates an example of a vehicle group.

In the example of FIG. 4, vehicles 301-1 to 301-5 travel substantially in line in front of the vehicle 10. In the case, for example, one vehicle group 301 including the vehicles 301-1 to 301-5 is detected.

Figure 5:
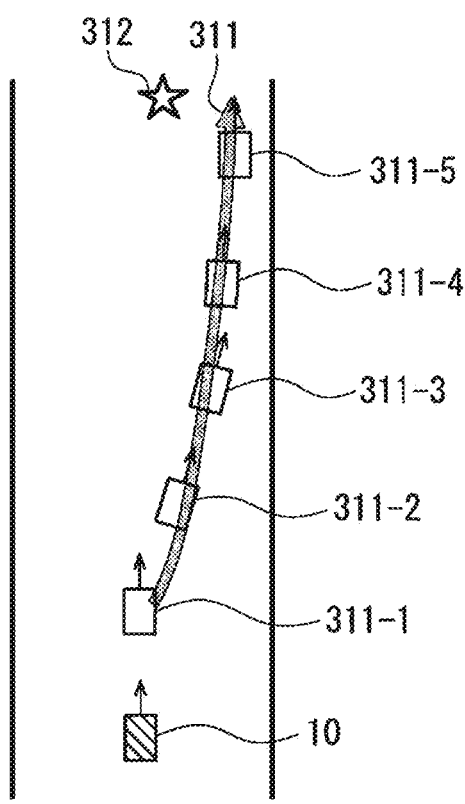
FIG. 5 illustrates an example of the vehicle group.

In the example of FIG. 5, vehicles 311-1 to 311-5 advance substantially in line on a route going around rightward to avoid an obstacle 312 in front of the vehicle 10. In the case, for example, one vehicle group 311 including the vehicles 311-1 to 311-5 is detected.

Figure 6:
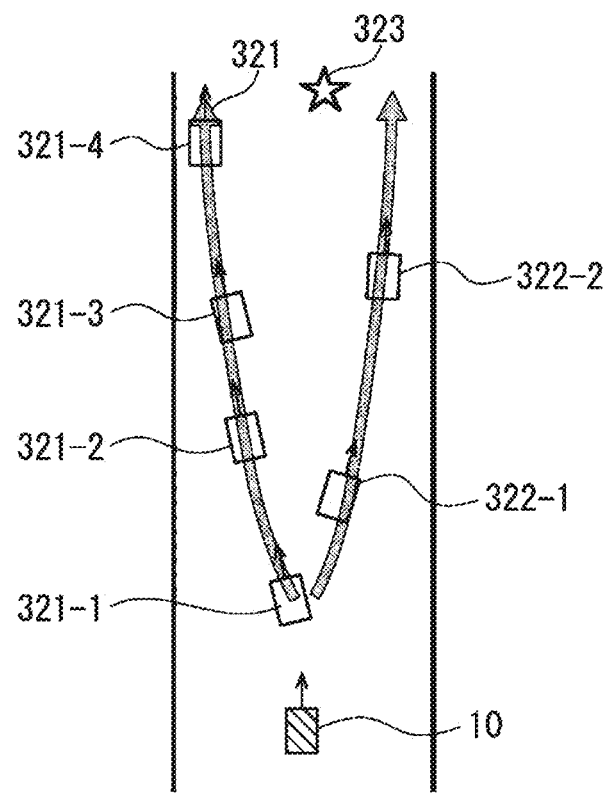
FIG. 6 illustrates an example of the vehicle group.

In the example of FIG. 6, vehicles 321-1 to 321-4 advance substantially in line on a route going around leftward to avoid an obstacle 323 in front of the vehicle 10. Furthermore, vehicles 322-1 and 322-2 advance substantially in line on a route going around rightward to avoid the obstacle 323 in front of the vehicle 10. In the case, for example, two vehicle groups of a vehicle group 321 and a vehicle group 322 are detected. The vehicle group 321 includes the vehicles 321-1 to 321-4. The vehicle group 322 includes the vehicles 322-1 and 322-2.

Figure 7:
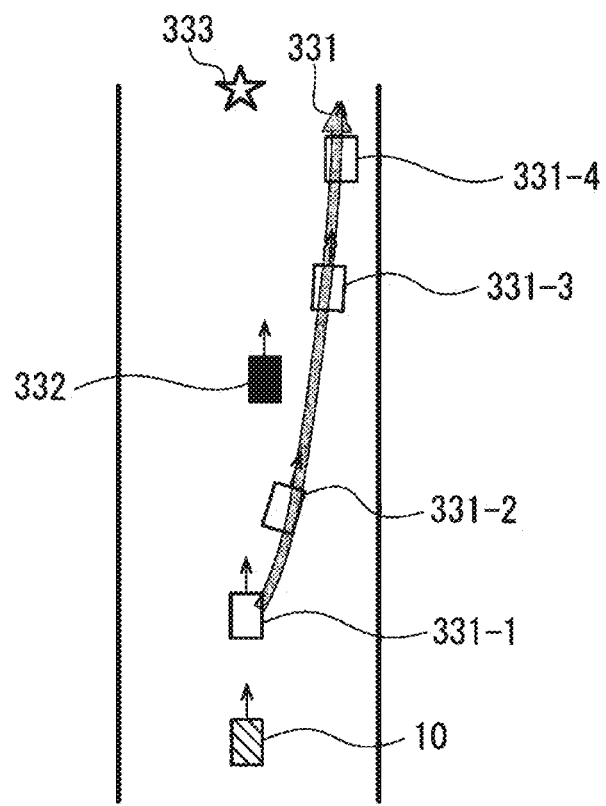
FIG. 7 illustrates an example of the vehicle group.

In the example of FIG. 7, vehicles 331-1 to 331-4 advance substantially in line on a route going around rightward to avoid an obstacle 333 in front of the vehicle 10. In contrast, a vehicle 332 advances in the direction of the obstacle 333 without avoiding the obstacle 333 like the vehicles 331-1 to 331-4. In the case, for example, a vehicle group 331 including the vehicles 331-1 to 331-4 is detected, and the vehicle 332 is detected as one vehicle group.

As in the example, in a case where a vehicle independently travels without synchronization with other vehicles, a vehicle group including only one vehicle can be detected.

Figure 8:
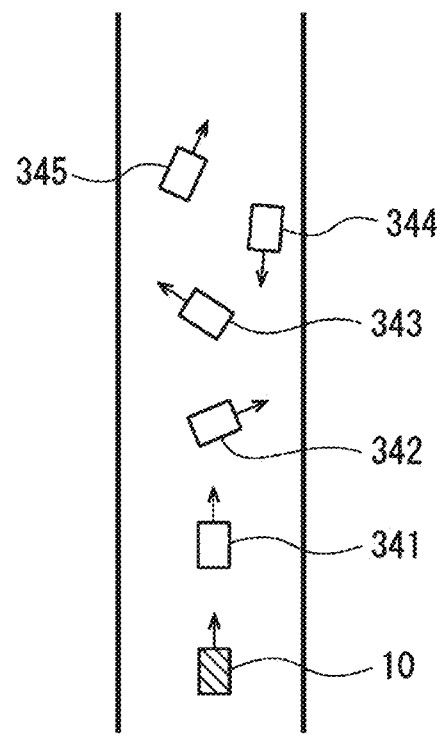
FIG. 8 illustrates an example of the vehicle group.

In the example in FIG. 8, vehicles 341 to 345 advance in different directions without synchronization in front of the vehicle 10. In the case, for example, the vehicles 341 to 345 are detected as different vehicle groups.

Note that another vehicle can be clustered by any clustering approach. Furthermore, for example, a unique clustering approach may be built by, for example, machine learning using big data.

Note, however, that, for example, as in the examples in FIGS. 5, 6, and 7, in a case where a vehicle train constituting a vehicle group is curved, the movement direction of a head vehicle and that of the last vehicle may be dramatically different. In a case where the movement direction of a head vehicle and that of the last vehicle are dramatically different but one vehicle train is configured as a whole, a clustering approach in which the vehicle train is detected as one cluster is desirably used.

Furthermore, the range in which a vehicle group is detected may be limited, or does not need to be limited. For example, the range in which a vehicle group is detected may be limited to a range reached by the vehicle 10 within a predetermined period of time. Alternatively, for example, a vehicle group may be detected within a range in which the vehicle detection unit 231 can detect another vehicle without limiting the range in which the vehicle group is detected.

The vehicle group detection unit 232 supplies data indicating the detection result regarding the vehicle group to the action planning unit 222 and the vehicle group action estimation unit 233.

In Step S5, the action planning unit 222 plans the action of the host vehicle (i.e., vehicle 10). For example, the action planning unit 222 plans the action of the vehicle 10 for safely traveling on a separately planned route within a planned period of time on the basis of the analysis result regarding the situation around the vehicle 10 from the vehicle exterior situation analysis unit 221 and the map data stored in the map DB 207. For example, the action planning unit 162 makes a plan regarding, for example, start, stop, advancing direction (e.g., forward movement, backward movement, left turn, right turn, change in direction, and the like), traveling lane, traveling speed, and overtaking. The action planning unit 222 supplies data indicating the planned action of the vehicle 10 to, for example, the comparison unit 204 and the motion planning unit 163 in FIG. 1.

The motion planning unit 163 plans the motion of the vehicle 10 for achieving the action that has been planned by the action planning unit 162, and supplies data indicating the planned motion of the vehicle 10 to, for example, the acceleration/deceleration control unit 172 and the direction control unit 173 of the motion control unit 135 in FIG. 1. Then, the acceleration/deceleration control unit 172 and the direction control unit 173 perform, for example, acceleration/deceleration control and direction control over the vehicle 10, so that the vehicle 10 performs the motion that has been planned by the motion planning unit 163.

In Step S6, the vehicle group action estimation unit 233 estimates the action plan of a vehicle group. Specifically, the vehicle group action estimation unit 233 estimates an action plan such as a route of each vehicle group on the basis of the position and speed vector of another vehicle belonging to each vehicle group. The vehicle group action estimation unit 233 supplies the detection result regarding each vehicle group and data indicating the estimation result regarding the action plan of each vehicle group to, for example, the comparison unit 204, the determination unit 206, and the output control unit 105 in FIG. 1.

Note that any approach can be used for estimating an action plan of a vehicle group.

The determination unit 206 determines the detection precision of a vehicle group and the estimation precision of an action plan of the vehicle group. The determination unit 206 supplies data indicating the determination result to the action planning unit 222.

Note that any approach can be used for detecting the detection precision of a vehicle group and the estimation precision of an action plan of the vehicle group.

In Step S7, the comparison unit 204 and the obstacle estimation unit 205 perform processing of estimating an obstacle. For example, the comparison unit 204 compares a scheduled route of the vehicle 10 with an estimated route of each vehicle group. Then, in a case where there is a vehicle group whose estimated route is significantly different from the scheduled route of the vehicle 10, the comparison unit 204 supplies data indicating the estimated route of the vehicle group and the scheduled route of the vehicle 10 to the obstacle estimation unit 205.

The obstacle estimation unit 205 estimates the position of an obstacle on the basis of the scheduled route of the vehicle 10 and the estimated route of the vehicle group significantly different from the scheduled route of the vehicle 10. For example, the obstacle estimation unit 205 estimates that an obstacle exists on a route, through which a vehicle group is estimated not to pass, among the scheduled routes of the vehicle 10.

Figure 9:
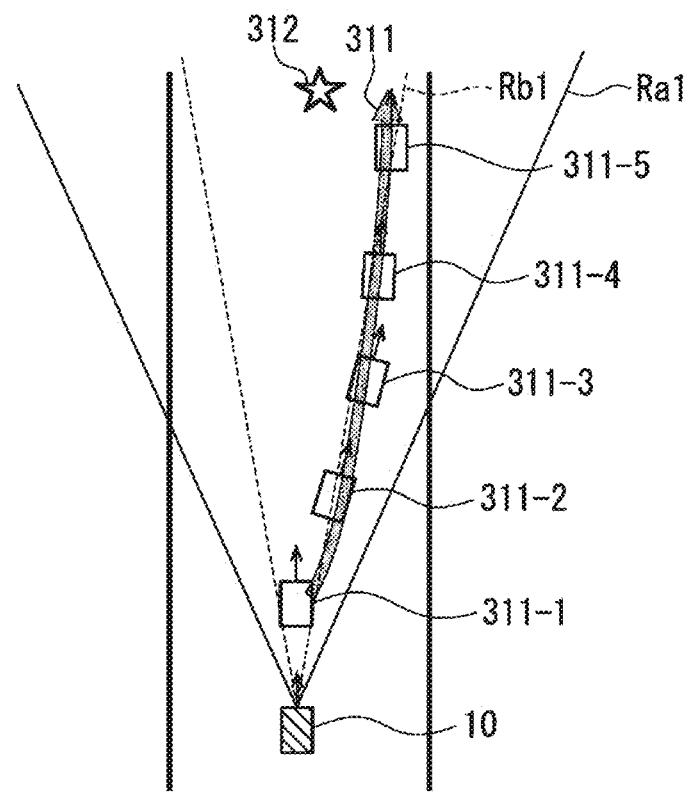
FIG. 9 illustrates a method of estimating an obstacle.

FIG. 9 is obtained by adding a detection region Ra1 and a blind-angle region Rb2 in the detection region Ra1 to FIG. 5. In the detection region Ra1, the vehicle 10 can detect an object in front. The blind-angle region Rb2 is generated by the vehicle 311-1 immediately in front of the vehicle 10.

In the example, the vehicle 10 cannot detect the obstacle 312 since the obstacle 312 is in the blind-angle region Rb1. In contrast, in a case where a scheduled route is set so that the vehicle 10 goes straight, the estimated route of the vehicle group 311 indicated by an arrow is different from the scheduled route of the vehicle 10. Then, the obstacle estimation unit 205 estimates that an obstacle exists on a route, through which the vehicle group 311 is estimated not to pass, among the scheduled routes of the vehicle 10. As a result, the obstacle estimation unit 205 can preliminarily estimate the existence of the obstacle 312 in the blind angle of the vehicle 10.

Figure 10:
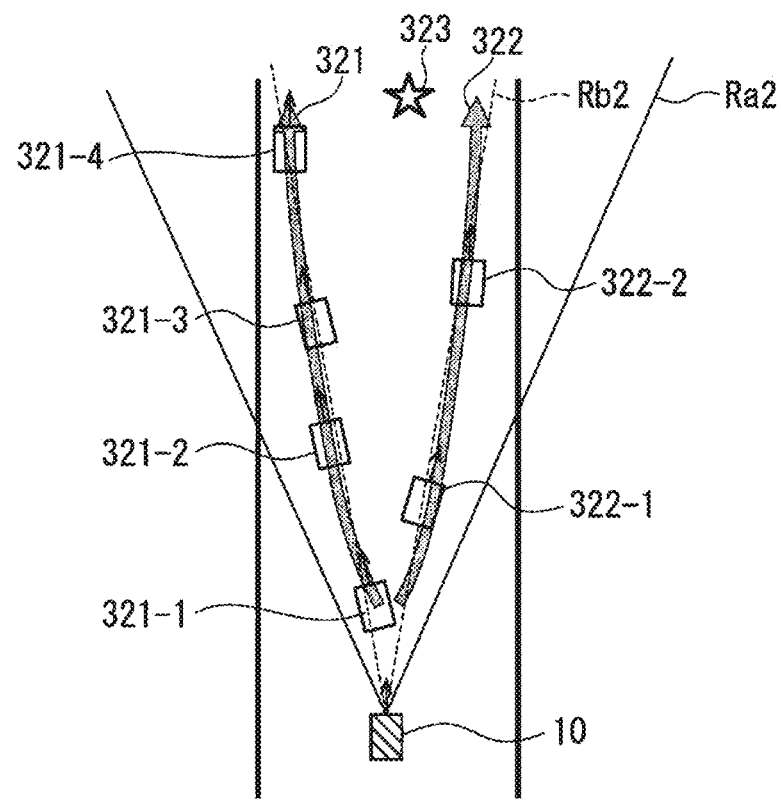
FIG. 10 illustrates the method of estimating an obstacle.

FIG. 10 is obtained by adding a detection region Ra2 of the vehicle 10 and a blind-angle region Rb2 to FIG. 6. The blind-angle region Rb2 is generated by the vehicle 321-1 immediately in front of the vehicle 10.

In the example, the vehicle 10 cannot detect the obstacle 323 since the obstacle 323 is in the blind-angle region Rb1. In contrast, in a case where a scheduled route is set so that the vehicle 10 goes straight, the estimated routes of the vehicle groups 321 and 322 indicated by arrows are different from the scheduled route of the vehicle 10. Then, the obstacle estimation unit 205 estimates that an obstacle exists on a route, through which the vehicle groups 321 and 322 are estimated not to pass, among the scheduled routes of the vehicle 10. As a result, the obstacle estimation unit 205 can preliminarily estimate the existence of the obstacle 323 in the blind angle of the vehicle 10.

FIGS. 11 to 21 schematically illustrate how the front of the vehicle 10 is, in particular, how a vehicle group including vehicles 351-1 to 351-3 avoids an obstacle. Note that objects illustrated at the lower ends of FIGS. 11 to 21 are a hood of the vehicle 10.

Figure 11:
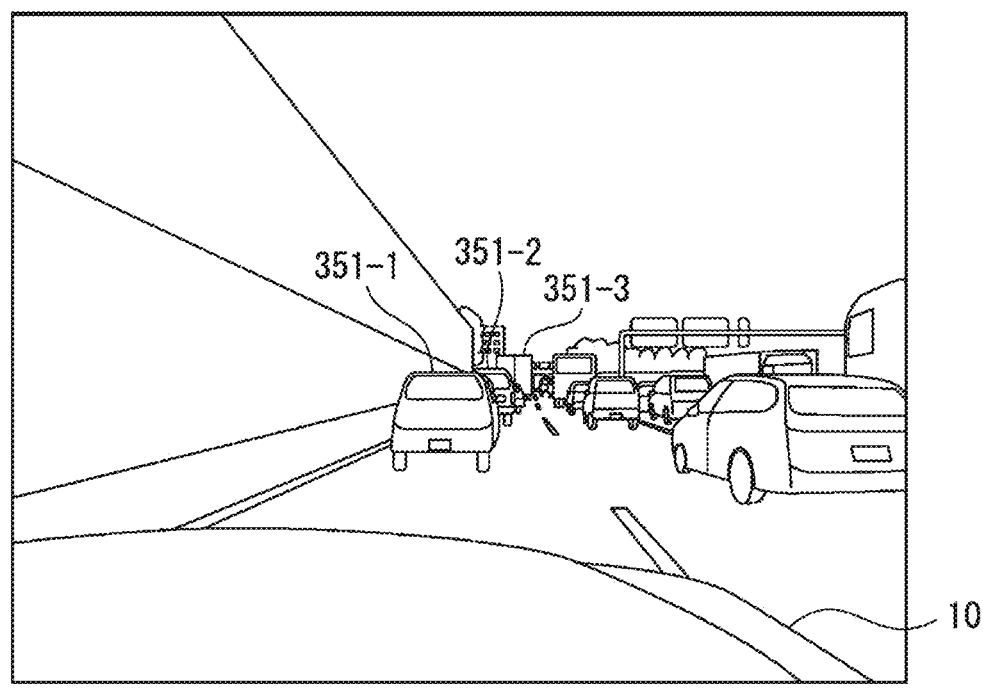
FIG. 11 illustrates the method of estimating an obstacle.
Figure 12:
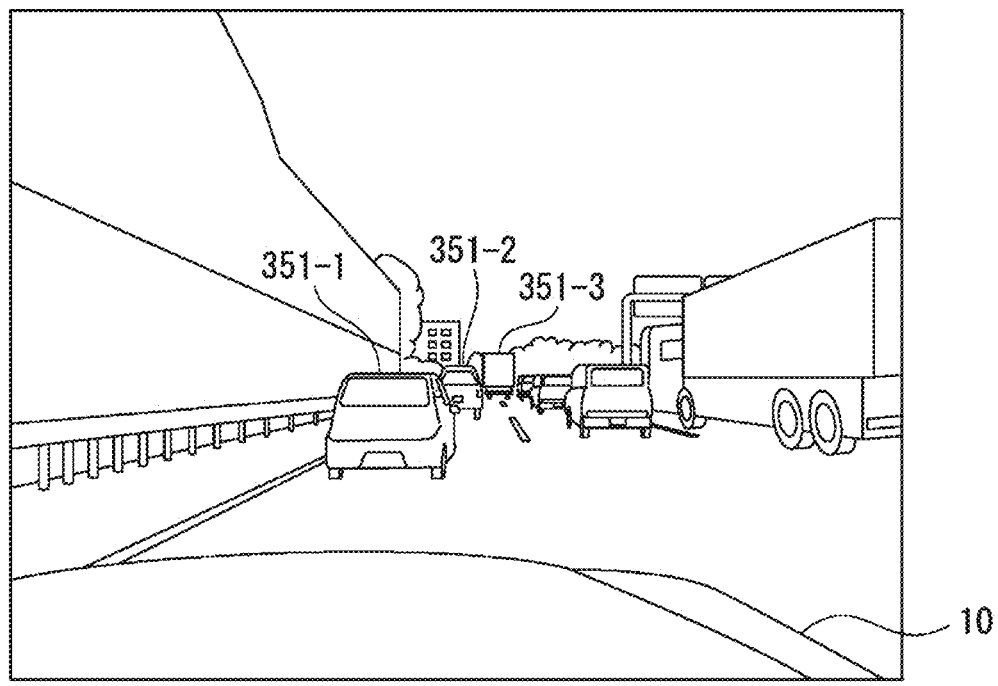
FIG. 12 illustrates the method of estimating an obstacle.
Figure 13:
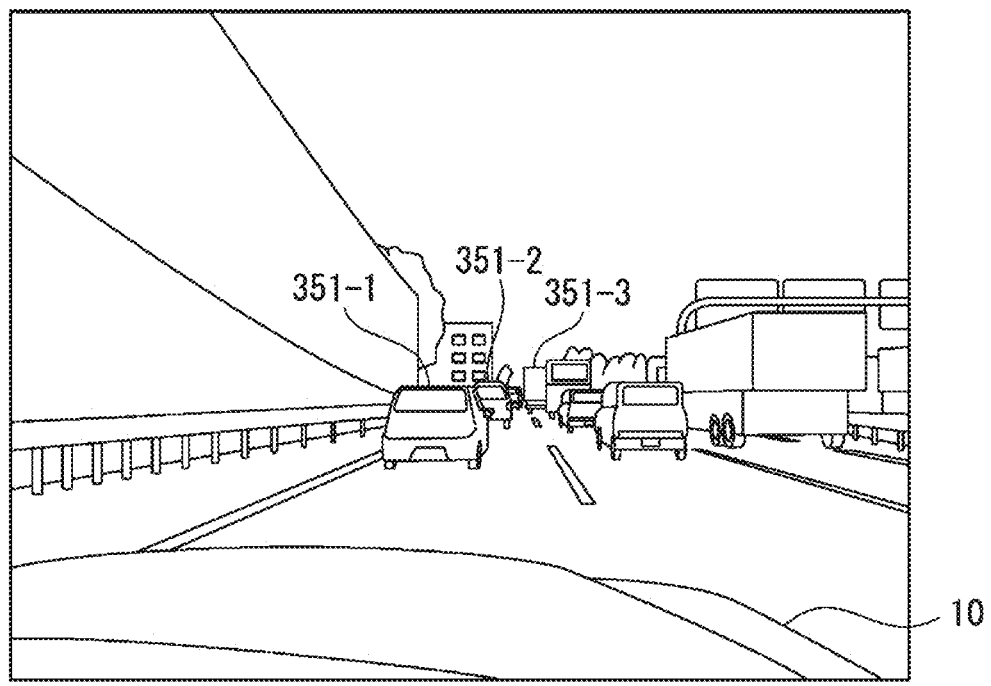
FIG. 13 illustrates the method of estimating an obstacle.
Figure 14:
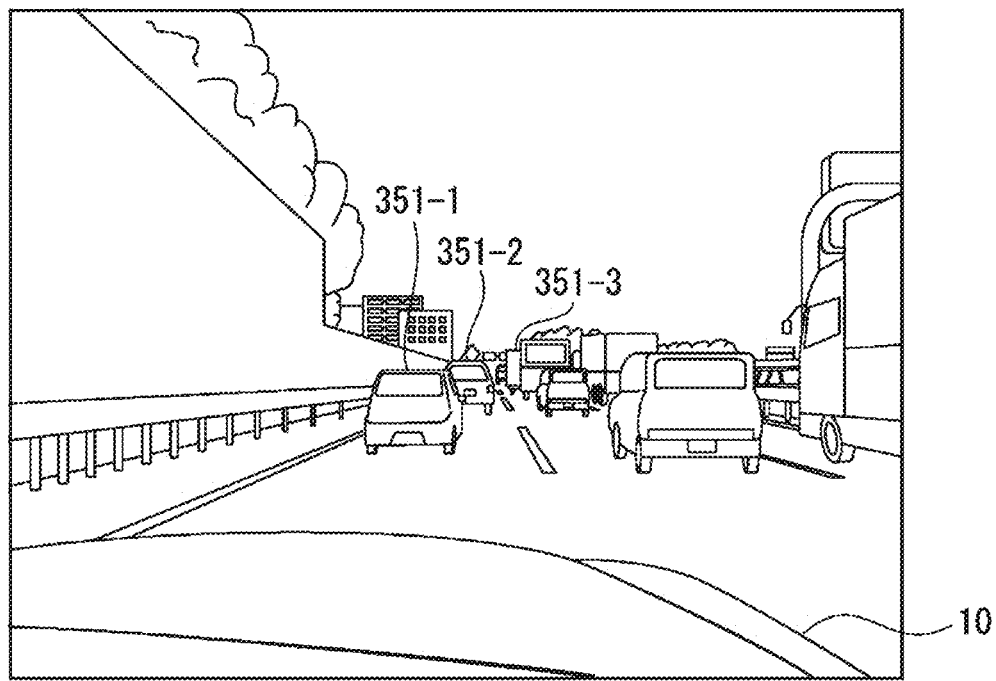
FIG. 14 illustrates the method of estimating an obstacle.
Figure 15:
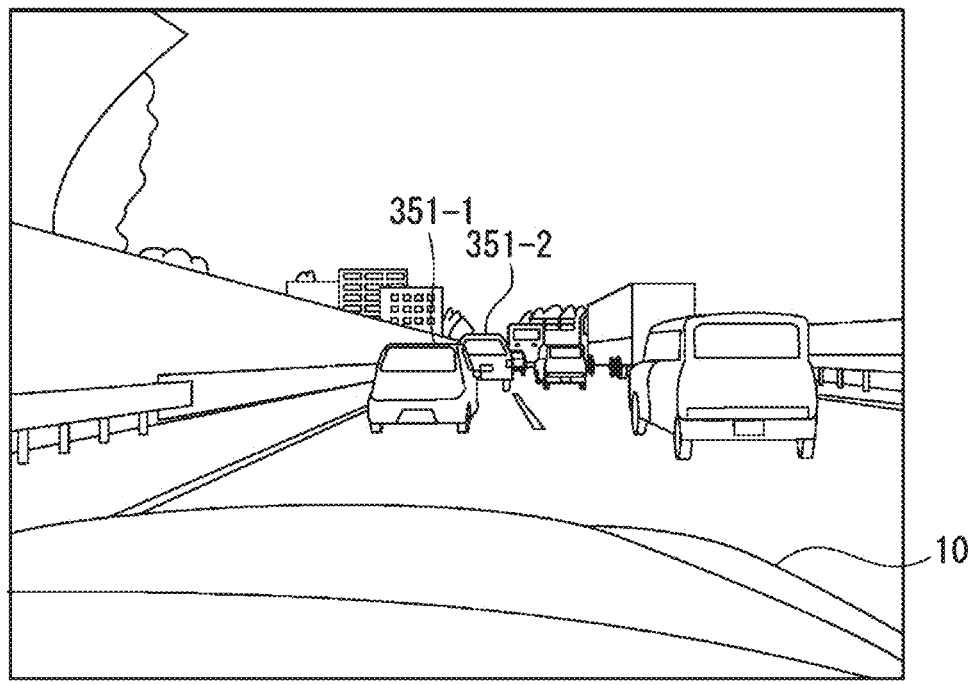
FIG. 15 illustrates the method of estimating an obstacle.
Figure 16:
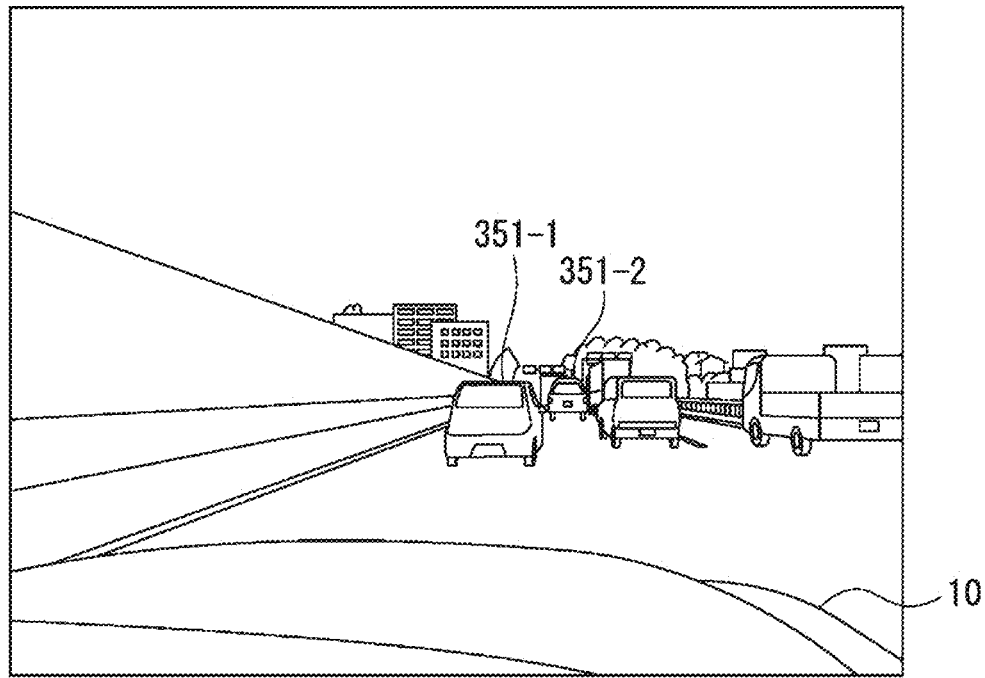
FIG. 16 illustrates the method of estimating an obstacle.
Figure 17:
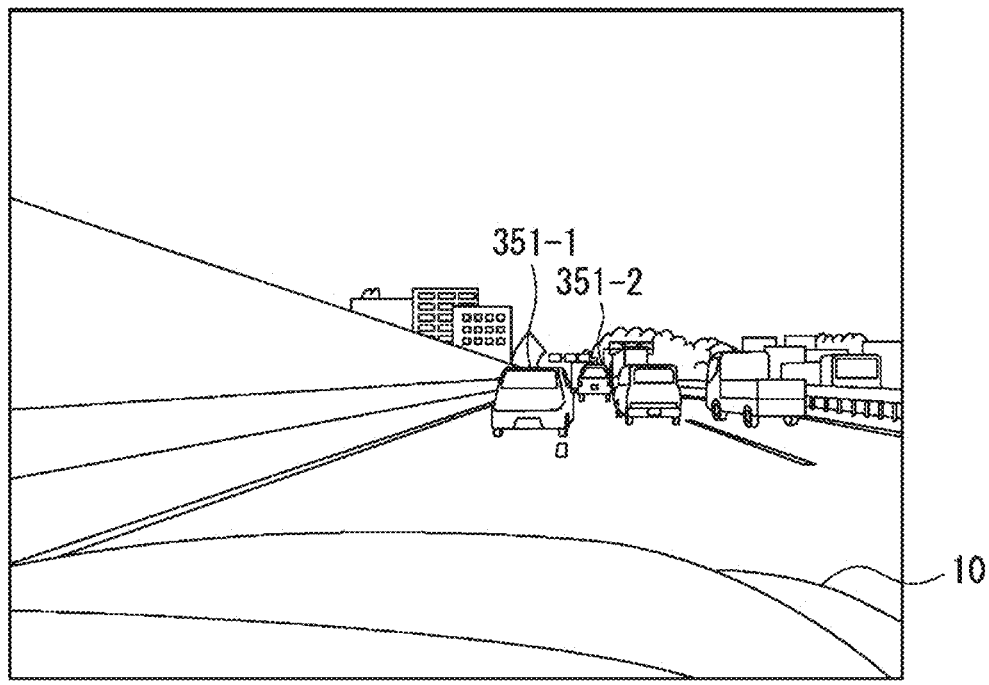
FIG. 17 illustrates the method of estimating an obstacle.
Figure 18:
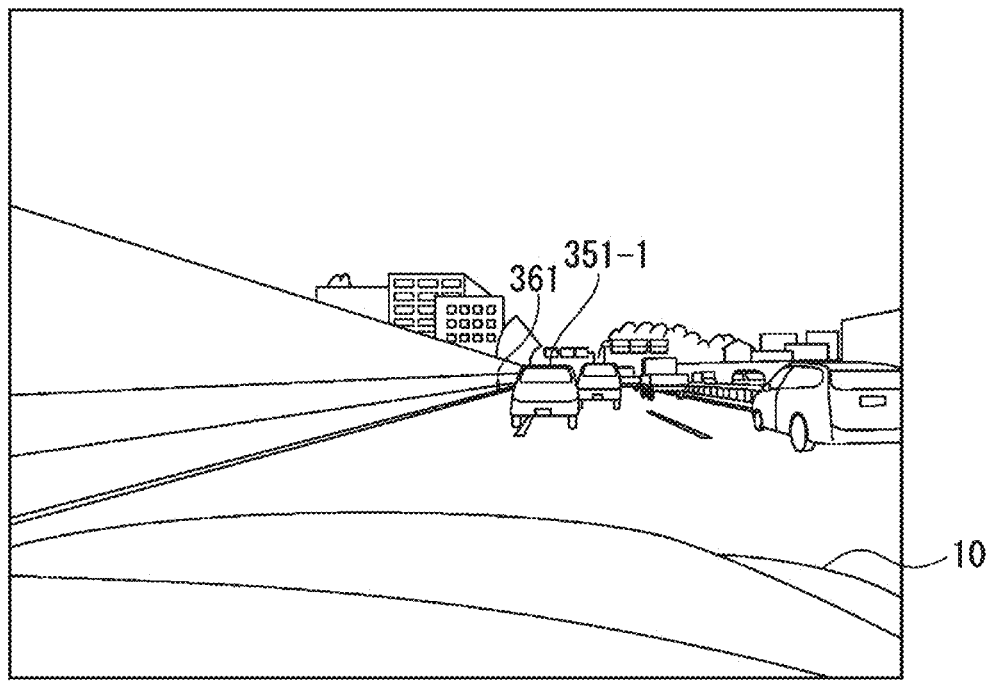
FIG. 18 illustrates the method of estimating an obstacle.
Figure 19:
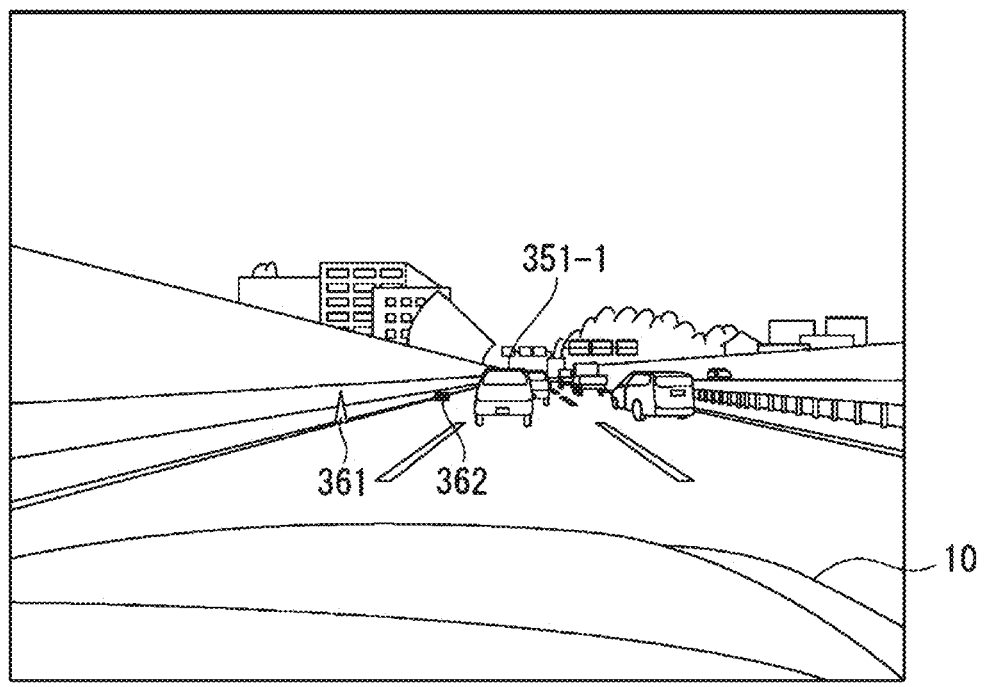
FIG. 19 illustrates the method of estimating an obstacle.
Figure 20:
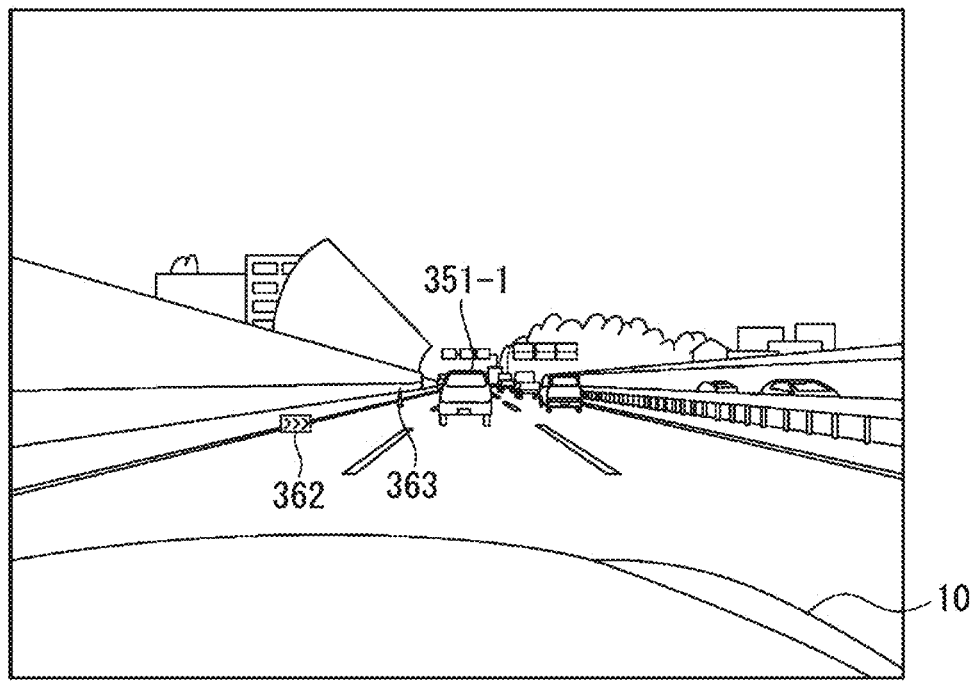
FIG. 20 illustrates the method of estimating an obstacle.
Figure 21:
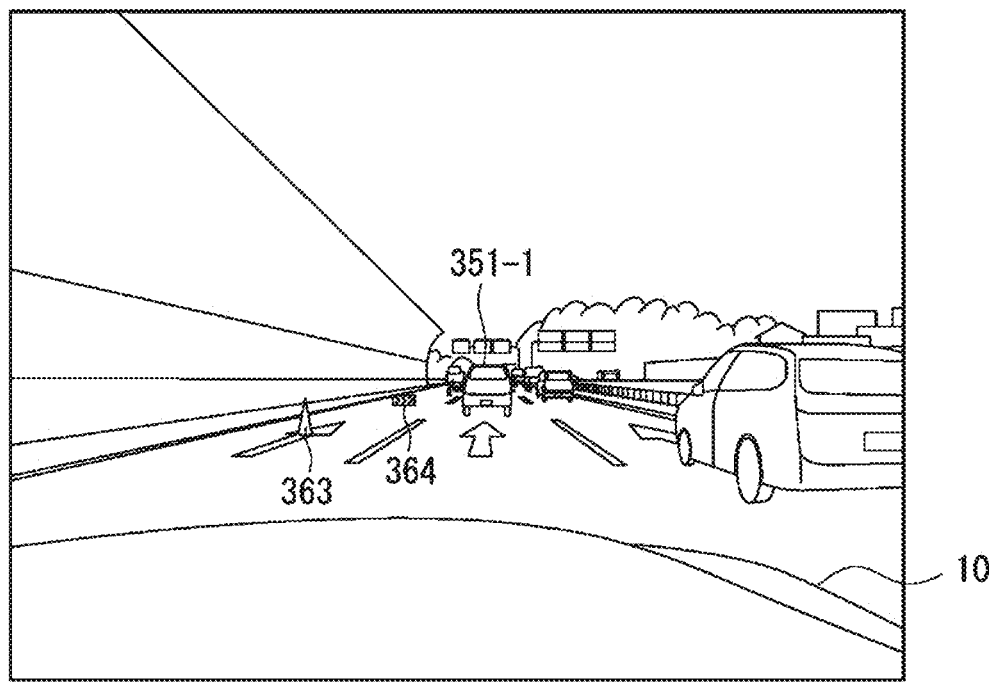
FIG. 21 illustrates the method of estimating an obstacle.

In the example, a scheduled route of the vehicle 10 is initially set such that the vehicle 10 goes straight in the leftmost lane. Furthermore, as illustrated in FIG. 11, a vehicle group including the vehicles 351-1 to 351-3 travels in front in the same lane as the vehicle 10. In contrast, as illustrated in FIGS. 18 to 21, a cone 361, a direction guide plate 362, a cone 363, and a direction guide plate 364 are placed in front in the lane, in which the vehicle 10 is traveling. Those obstacles are, however, invisible to the vehicle 10 since the obstacles are in a blind angle generated by, for example, the vehicle 351-1.

In contrast, as illustrated in FIGS. 11 to 17, the vehicles 351-1 to 351-3 are gradually moving rightward. As a result, the vehicle group including the vehicles 351-1 to 351-3 is estimated to change lanes to the next right lane. Consequently, it can be estimated that an obstacle of some kind exists on a route, through which a vehicle group is estimated not to pass, among the scheduled routes of the vehicle 10 since the scheduled route of the vehicle 10 and the estimated route of the vehicle group including the vehicles 351-1 to 351-3 are different. That is, the existence of an obstacle of some kind in front in the leftmost lane can be estimated before the cone 361, the direction guide plate 362, the cone 363, and the direction guide plate 364 are made visible to the vehicle 10.

The obstacle estimation unit 205 supplies data indicating the estimation result regarding the obstacle to the vehicle exterior situation analysis unit 221. This causes the vehicle exterior situation analysis unit 221 to recognize the estimated position of the obstacle, and causes the action planning unit 222 to plan the action of the vehicle 10 (e.g., plan a route of the vehicle 10 so that an obstacle is avoided) on the basis of the estimated position of the obstacle.

Thereafter, the processing returns to Step S1, and the processing after Step S1 is executed.

In this way, the situation of another vehicle can be accurately grasped by detecting a vehicle group in front of the vehicle 10. Then, for example, as described above with reference to FIGS. 8 to 21, the existence of an obstacle in a blind angle of the vehicle 10 can be quickly and accurately grasped. As a result, the action of the vehicle 10 can be more appropriately controlled, and an obstacle can be safely avoided.

3. Variations

Variations of the above-described embodiment of the present technology will be described below.

For example, in a case where the detection precision for a road surface is low due to, for example, snowfall (e.g., where the detection precision for road marking such as a white line is low), the action planning unit 222 may plan the action of the vehicle 10 on the basis of the estimated route of a vehicle group in front such that the vehicle 10 follows the vehicle group (travels in the same route as the vehicle group). In this way, even in a case where road marking cannot be detected, the vehicle 10 can safely travel without straying from a lane and dropping into a road shoulder by causing the vehicle 10 to follow a safely traveling vehicle group.

Furthermore, for example, similarly also in a case of poor visibility due to, for example, fog, the action planning unit 222 may plan the action of the vehicle 10 such that the vehicle 10 follows the vehicle group in front. This enables the vehicle 10 to travel safely. In particular, in a case where a vehicle mounted with a system for maintaining good view even in fog, such as night vision, exists in the vehicle group, the vehicle 10 can travel in accordance with that vehicle without significantly reducing a traveling speed.

Figure 22:
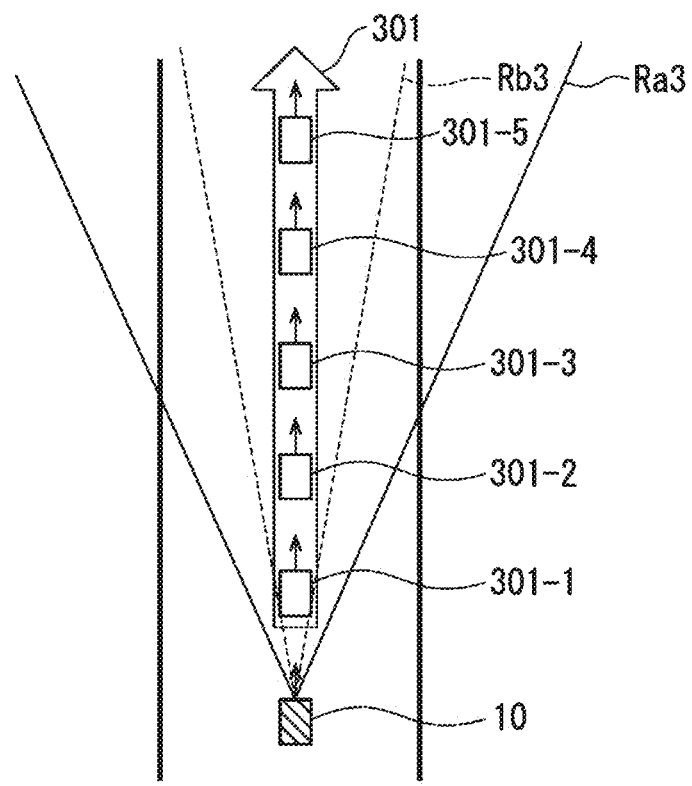
FIG. 22 illustrates a method of checking a vehicle group.

Moreover, FIG. 22 is obtained by adding a detection region Ra3 of the vehicle 10 and a blind-angle region Rb3 to FIG. 4. The blind-angle region Rb3 is generated by the vehicle 301-1 immediately in front of the vehicle 10. In this way, in a case where the vehicle 10 follows the vehicle group 301 traveling in a substantially straight line, the vehicle 10 has difficulty in grasping the entire image of the vehicle group 301, and the detection precision of the vehicle group 301 is lowered.

Figure 23:
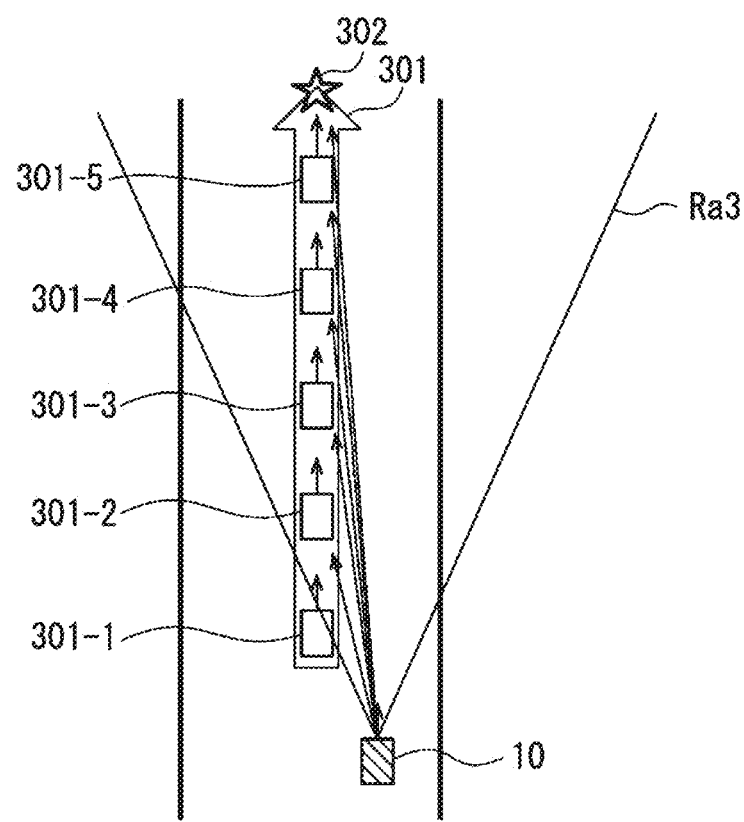
FIG. 23 illustrates the method of checking a vehicle group.

In contrast, for example, as illustrated in FIG. 23, the action planning unit 222 may plan the action of the vehicle 10 such that the vehicle 10 moves to the position laterally shifted with respect to the movement direction of the vehicle group 301 at predetermined timing (e.g., predetermined interval). As a result, all the vehicles 301-1 to 301-5 constituting the vehicle group 301 come within the detection region Ra3 of the vehicle 10, and the detection precision of the vehicle group 301 is improved. Furthermore, for example, in a case where an obstacle 302 is placed in front of the vehicle group 301, the obstacle 302 can be quickly detected.

Figure 24:
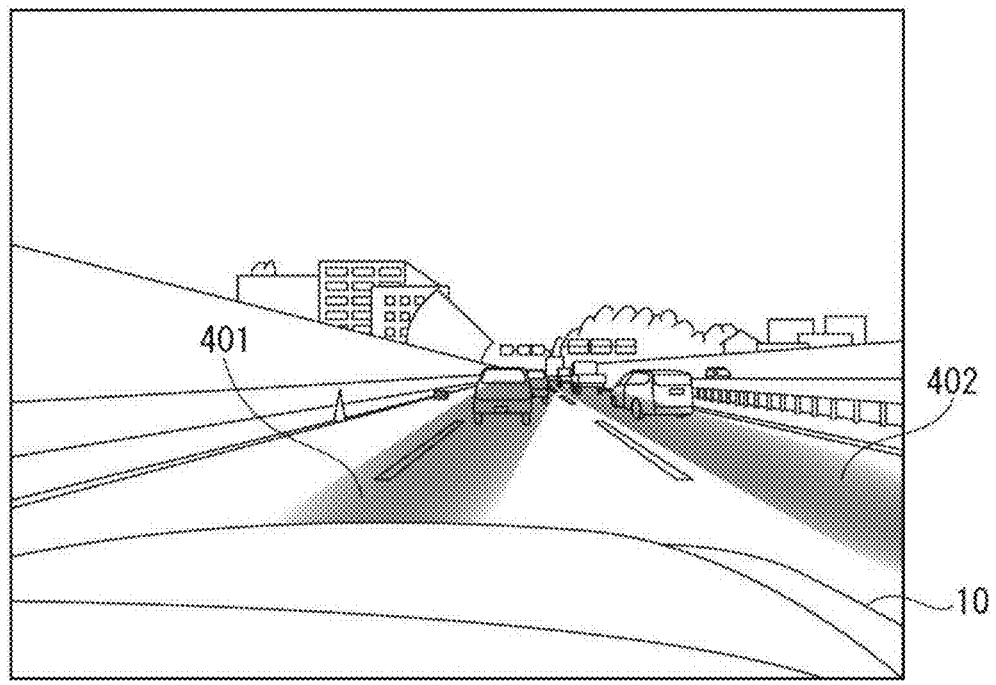
FIG. 24 illustrates a display example of information regarding a vehicle group.
Figure 25:
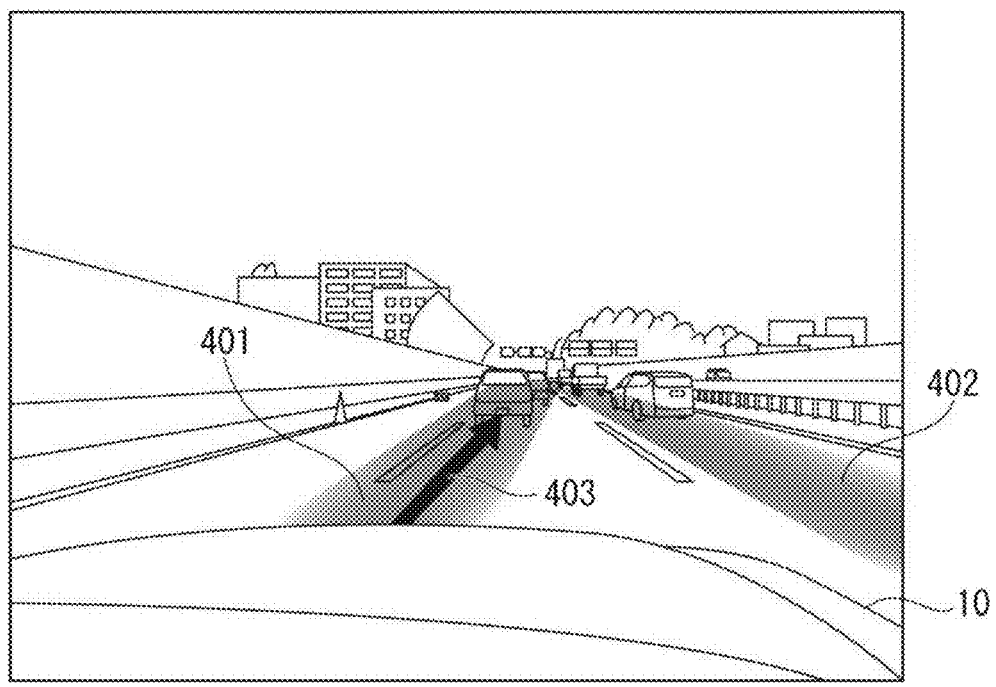
FIG. 25 illustrates a display example of information regarding a vehicle group.

Furthermore, for example, the output unit 106 in FIG. 1 may display information regarding the vehicle group under the control of the output control unit 105. FIGS. 24 and 25 illustrate examples of a method of displaying information regarding a vehicle group.

In the example of FIG. 24, a display effect 401 and a display effect 402 indicating a route that a vehicle group has passed through are displayed in a superimposed manner on an image in front of the vehicle 10. Consequently, the display effects 401 and 402 indicate a region with low risk (traveling cost).

Furthermore, for example, as illustrated in FIG. 25, a recommended route may be indicated by, for example, an arrow 403.

Note that, for example, the display effects 401 and 402, the arrow 403, and the like may be superimposed and displayed in the field of view of a driver of the vehicle 10 by using, for example, a head-up display.

Furthermore, although, in the above description, an example, in which a vehicle group is detected on the basis of the positions and movement vectors (speeds and movement directions) of other vehicles, is illustrated, the vehicle group may be detected on the basis of one or two of the positions, speeds, and movement directions of other vehicles.

Furthermore, for example, the assignation of functions for each unit in FIG. 2 can be changed if necessary. For example, the vehicle exterior situation analysis unit 221 may absorb the function of the vehicle detection unit 231. Furthermore, for example, the action planning unit 222 may plan the action of the vehicle 10 on the basis of the estimation result of the vehicle group action estimation unit 233.

Moreover, the present technology can be applied to the case of detecting a moving object group around various moving objects such as a motorcycle, a bicycle, a personal mobility, an airplane, a ship, a construction machine, and an agricultural machine (tractor) in addition to the above-described vehicles. Furthermore, moving objects to which the present technology can be applied include, for example, a moving object, such as a drone and a robot, remotely driven (operated) by a user without boarding.

Furthermore, a moving object group to be detected may include different types of moving objects. For example, the moving object group may include not only vehicles but also, for example, motorcycles.

Moreover, the detection direction of a moving object group is not limited to the front of the moving object group, and a direction other than the front surrounding the moving object may be detected. For example, in a case where a moving object advances in a direction other than the forward direction, the advancing direction may be set in the detection direction of the moving object group.

4. Others

<Configuration Example of Computer>

The above-described series of processing can be executed by hardware or software. In a case where the series of processing is executed by software, a program constituting the software is installed in a computer. The computer here includes, for example, a computer incorporated in dedicated hardware and, for example, a general-purpose personal computer capable of executing various functions by installing various programs.

Figure 26:
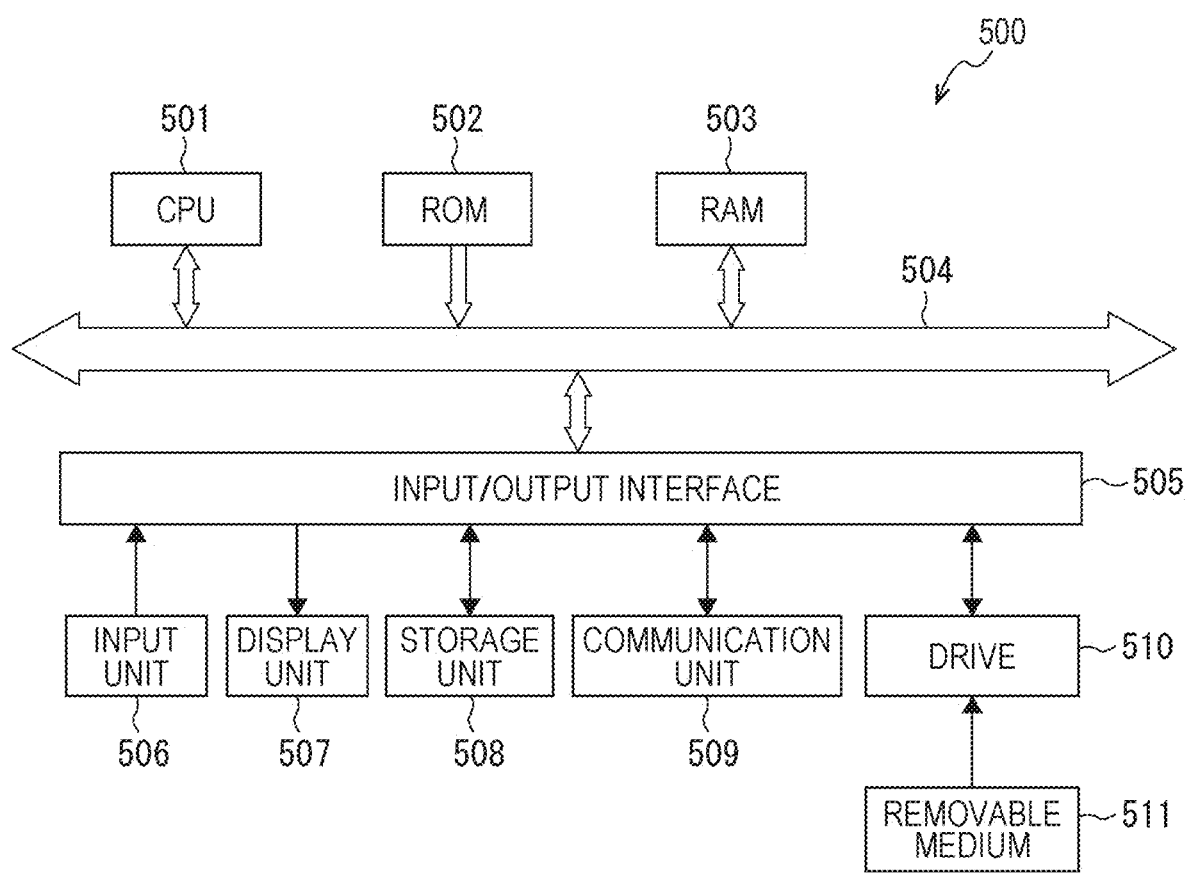
FIG. 26 illustrates a configuration example of a computer.

FIG. 26 is a block diagram illustrating a configuration example of hardware of a computer that executes the above-described series of processing by using a program.

In a computer 500, a central processing unit (CPU) 501, a read only memory (ROM) 502, and a random access memory (RAM) 503 are connected to each other by a bus 504.

An input/output interface 505 is also connected to the bus 504. An input unit 506, an output unit 507, a recording unit 508, a communication unit 509, and a drive 510 are connected to the input/output interface 505.

The input unit 506 includes, for example, an input switch, a button, a microphone, and an imaging element. The output unit 507 includes, for example, a display, and a speaker. The recording unit 508 includes, for example, a hard disk and a nonvolatile memory. The communication unit 509 includes, for example, a network interface. The drive 510 drives a removable recording medium 511 such as a magnetic disk, an optical disk, a magneto-optical disk, and a semiconductor memory.

In the computer 500 configured as described above, the above-described series of processing is performed by the CPU 501 loading, for example, a program recorded in the recording unit 508 in the RAM 503 via the input/output interface 505 and the bus 504 and executing the program.

A program to be executed by the computer 500 (CPU 501) can be provided by, for example, being recorded in the removable recording medium 511 serving as a package medium and the like. Furthermore, the program can be provided via a wired or wireless transmission medium such as a local area network, the Internet, and digital satellite broadcasting.

In the computer 500, the program can be installed in the recording unit 508 via the input/output interface 505 by mounting the removable recording medium 511 in the drive 510. Furthermore, the program can be received by the communication unit 509 via a wired or wireless transmission medium, and installed in the recording unit 508. In addition, the program can be installed in the ROM 502 and the recording unit 508 in advance.

Note that a program executed by a computer may be chronologically processed along the order described in the specification, or may be processed in parallel or at necessary timing, for example, the timing when calling is performed.

Furthermore, in the specification, a system means a collection of a plurality of components (e.g., apparatuses and modules (parts)), and it does not matter whether or not all the components are placed in the same housing. Consequently, both of a plurality of apparatuses accommodated in different housings and connected via a network, and one apparatus having a plurality of modules accommodated in one housing are systems.

Moreover, an embodiment of the present technology is not limited to the above-described embodiment, and various modifications are possible without departing from the spirit of the present technology.

For example, the present technology can have a configuration of cloud computing in which a plurality of apparatuses shares one function via a network and performs processing together.

Furthermore, in addition to being executed by one apparatus, each step described in the above-described flowchart can be shared and executed by a plurality of apparatuses.

Moreover, in a case where one step includes a plurality of pieces of processing, the plurality of pieces of processing included in that one step can be shared and executed by a plurality of apparatuses in addition to being executed by one apparatus.

<Examples of Combination of Configuration>

The present technology can also have the configuration as follows.

(1)
An information processing apparatus including:
a moving object detection unit that detects another moving object around a moving object; and
a moving object group detection unit that detects a moving object group including two or more of the other moving objects on the basis of one or more of a position, speed, and movement direction of the other moving object.

(2)
The information processing apparatus according to (1),
in which the moving object group detection unit detects the moving object group by clustering the other moving object on the basis of one or more of a position, speed, and movement direction of the other moving object.

(3)
The information processing apparatus according to (1) or (2),
in which the moving object group includes two or more of the other moving objects that move substantially in line in an advancing direction of the moving object.

(4)
The information processing apparatus according to any one of (1) to (3), further including
a moving object group action estimation unit that estimates action of the moving object group on the basis of a speed and movement direction of the other moving object constituting the moving object group.

(5)
The information processing apparatus according to (4), further including
an obstacle estimation unit that estimates a position of an obstacle on the basis of a route of the moving object group, the route being estimated by the moving object group action estimation unit.

(6)
The information processing apparatus according to (5),
in which, in a case where a scheduled route, through which the moving object is scheduled to move, and an estimated route of the moving object group are different, the obstacle estimation unit estimates that the obstacle exists on a route, through which the moving object group is estimated not to pass, among the scheduled routes of the moving object.

(7)
The information processing apparatus according to (5) or (6), further including
an action planning unit that plans action of the moving object on the basis of an estimated position of the obstacle.

(8)
The information processing apparatus according to any one of (1) to (6), further including
an action planning unit that plans action of the moving object on the basis of a detection result of the moving object group.

(9)
The information processing apparatus according to (8),
in which, in a case of poor visibility in an advancing direction of the moving object, the action planning unit plans action of the moving object such that the moving object follows the moving object group.

(10)
The information processing apparatus according to (8) or (9),
in which, in a case of low detection precision for a road surface in an advancing direction of the moving object, the action planning unit plans action of the moving object such that the moving object follows the moving object group.

(11)
The information processing apparatus according to any one of (8) to (10),
in which, in a case where the moving object follows the moving object group, the action planning unit plans action of the moving object such that the moving object moves to a position laterally shifted with respect to an advancing direction of the moving object group at predetermined timing.

(12)
The information processing apparatus according to any one of (1) to (11), further including
an output control unit that controls display of information regarding the moving object group.

(13)
An information processing method,
in which an information processing layer apparatus
detects another moving object around a moving object; and
detects a moving object group including two or more of the other moving objects on the basis of one or more of a position, speed, and movement direction of the other moving object.

(14)
A moving object including:
a moving object detection unit that detects another surrounding moving object; and
a moving object group detection unit that detects a moving object group including two or more of the other moving objects on the basis of one or more of a position, speed, and movement direction of the other moving object.

(15)
A vehicle including:
a vehicle detection unit that detects another surrounding vehicle; and
a vehicle group detection unit that detects a vehicle group including two or more of the other vehicles on the basis of one or more of a position, speed, and movement direction of the other vehicle.

Note that, the effects described in the specification are merely illustrations, and are not limited. There may exist another effect.

REFERENCE SIGNS LIST

10 Vehicle
100 Vehicle control system

102 Data acquisition unit
105 Output control unit
106 Output unit
133 Situation analysis unit
141 Vehicle exterior information detection unit
162 Action planning unit
163 Motion planning unit
135 Motion control unit
200 Action planning system
202 Action plan processing unit
203 Vehicle group detection processing unit
204 Comparison unit
205 Obstacle estimation unit
206 Determination unit
221 Vehicle exterior situation analysis unit
222 Action planning unit
231 Vehicle detection unit
232 Vehicle group detection unit
233 Vehicle group action estimation unit
301, 311, 321, 322, 331, 332, and 341 to 345 Vehicle group

The invention claimed is:

1. An information processing apparatus comprising:
circuitry configured to
detect a plurality of other moving objects around a moving object; and
detect a plurality of moving object groups, each of the moving object groups including two or more of the plurality of other moving objects that move substantially in a line in an advancing direction of the moving object;
plan a scheduled route of the moving object;
determine an estimated route of each of the moving object groups;
compare the scheduled route and the estimated route of at least one of the moving object groups; and
in a case where the scheduled route, through which the moving object is scheduled to move, and the estimated route of the at least one of the moving object groups are different, estimate that an obstacle exists on the scheduled route, through which the at least one of the moving object groups is estimated not to pass.

2. The information processing apparatus according to claim 1, wherein the circuitry is further configured to:
detect the moving object groups by clustering the plurality of other moving objects on a basis of one or more of the position, the speed, and the movement direction of the plurality of other moving objects.

3. The information processing apparatus according to claim 1, wherein the circuitry is further configured to:
estimate an action of each of the moving object groups on a basis of the speed and the movement direction of the two or more of the plurality of other moving objects constituting each of the moving object groups.

4. The information processing apparatus according to claim 3, wherein the circuitry is further configured to:
estimate a position of the obstacle on a basis of the estimated route of the at least one of the moving object groups.

5. The information processing apparatus according to claim 4, wherein the circuitry is further configured to:
plan an action of the moving object on a basis of the estimated position of the obstacle.

6. The information processing apparatus according to claim 1, wherein the circuitry is further configured to:
plan an action of the moving object on a basis of a detection result of the at least one of the moving object groups.

7. The information processing apparatus according to claim 6,
wherein, in a case of poor visibility in an advancing direction of the moving object, the circuitry is configured to plan the action of the moving object such that the moving object follows one of the moving object groups.

8. The information processing apparatus according to claim 6,
wherein, in a case of low detection precision for a road surface in an advancing direction of the moving object, the circuitry is configured to plan the action of the moving object such that the moving object follows one of the moving object groups.

9. The information processing apparatus according to claim 6,
wherein, in a case where the moving object follows one of the moving object groups, the circuitry is configured to plan the action of the moving object such that the moving object moves to a position laterally shifted with respect to an advancing direction of the one of the moving object groups at predetermined timing.

10. The information processing apparatus according to claim 1, wherein the circuitry is further configured to:
display information regarding the moving object groups.

11. An information processing method for a moving object, comprising:
detecting other moving objects around the moving object;
detecting a plurality of moving object groups, each of the moving object groups including two or more of the other moving objects that move substantially in a line in an advancing direction of the moving object;
planning a scheduled route of the moving object;
determining an estimated route of each of the moving object groups;
comparing the scheduled route and the estimated route of at least one of the moving object groups; and
in a case where the scheduled route, through which the moving object is scheduled to move, and the estimated route of the at least one of the moving object groups are different, estimating that an obstacle exists on the scheduled route, through which the at least one of the moving object groups is estimated not to pass.

12. A moving object comprising:
circuitry configured to
detect other moving objects around the moving object; and
detect a plurality of moving object groups, each of the moving object groups including two or more of the other moving objects that move substantially in a line in an advancing direction of the moving object;
plan a scheduled route of the moving object;
determine an estimated route of each of the moving object groups;
compare the scheduled route and the estimated route of at least one of the moving object groups; and
in a case where the scheduled route, through which the moving object is scheduled to move, and the estimated route of the at least one of the moving object groups are different, estimate that an obstacle exists on the scheduled route, through which the at least one of the moving object groups is estimated not to pass.

13. A vehicle comprising:
circuitry configured to
  detect other vehicles around the vehicle;
  detect a plurality of vehicle groups, each of the vehicle groups including two or more of the other vehicles that move substantially in a line in an advancing direction of the vehicle;
  plan a scheduled route of the vehicle;
  determine an estimated route of each of the vehicle groups; and
  compare the scheduled route and the estimated route of at least one of the vehicle groups,
  in a case where the scheduled route, through which the vehicle is scheduled to move, and the estimated route of the at least one of the vehicle groups are different, estimate that an obstacle exists on the scheduled route, through which the at least one of the vehicle groups is estimated not to pass.

14. The information processing apparatus according to claim 1, wherein the circuitry is further configured to:
  update the scheduled route of the moving object to avoid the estimated obstacle.

* * * * *